United States Patent
Ando et al.

(10) Patent No.: US 8,461,795 B2
(45) Date of Patent: Jun. 11, 2013

(54) MOTOR DRIVE DEVICE AND ELECTRONIC DEVICE THAT USES THE SAME

(75) Inventors: Motohiro Ando, Kyoto (JP); Kenji Hama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 464 days.

(21) Appl. No.: 12/820,311

(22) Filed: Jun. 22, 2010

(65) Prior Publication Data
US 2010/0320955 A1    Dec. 23, 2010

(30) Foreign Application Priority Data
Jun. 23, 2009  (JP) .................................. 2009-148894

(51) Int. Cl.
*H02P 8/22*   (2006.01)

(52) U.S. Cl.
USPC .......................................... 318/696; 318/603

(58) Field of Classification Search
USPC ................. 318/560, 569, 590, 591, 600, 603, 318/606–610, 675, 685, 696
See application file for complete search history.

(56) References Cited

U.S. PATENT DOCUMENTS

| 5,703,455 | A | * | 12/1997 | Miyazaki | 318/685 |
| 5,744,929 | A | * | 4/1998 | Miyazaki | 318/696 |
| 6,208,107 | B1 | * | 3/2001 | Maske et al. | 318/685 |
| 6,690,139 | B1 | * | 2/2004 | Seibel | 318/798 |
| 7,969,115 | B2 | * | 6/2011 | Ando | 318/685 |
| 2002/0093303 | A1 | * | 7/2002 | Lo | 318/569 |

FOREIGN PATENT DOCUMENTS

JP   2008-029146   2/2008

* cited by examiner

*Primary Examiner* — Bentsu Ro
(74) *Attorney, Agent, or Firm* — Fish & Richardson P.C.

(57) ABSTRACT

A motor drive device in which the torque vector of the motor is controlled so that the correlation between the number of pulses of a clock signal and the phase of the torque vector of the motor is held in common for multiple excitation methods. The excitation method having the greatest number of steps is used as a reference, and the torque vector of the motor is maintained in the same phase as before switching when the excitation method is switched. The torque vector is in the closest phase in the rotation direction of the motor when there is no phase that is the same as the phase prior to switching.

20 Claims, 20 Drawing Sheets

FIG. 11A

CWCCW=H/L

| FULL | → | HALF |
|---|---|---|
| 1 | → | 1 |
| 5 | → | 5 |
| 9 | → | 9 |
| 13 | → | 13 |

FIG. 11B

CWCCW=L

| HALF | → | FULL |
|---|---|---|
| 1 | → | 1 |
| 3 | → | 5 |
| 5 | → | 5 |
| 7 | → | 9 |
| 9 | → | 9 |
| 11 | → | 13 |
| 13 | → | 13 |
| 15 | → | 1 |

FIG. 11C

CWCCW=H

| HALF | → | FULL |
|---|---|---|
| 1 | → | 1 |
| 3 | → | 1 |
| 5 | → | 5 |
| 7 | → | 5 |
| 9 | → | 9 |
| 11 | → | 9 |
| 13 | → | 13 |
| 15 | → | 13 |

FIG. 12A

CWCCW=H/L

| FULL | → | QUARTER |
|---|---|---|
| 1 | → | 1 |
| 5 | → | 5 |
| 9 | → | 9 |
| 13 | → | 13 |

FIG. 12B

CWCCW=L

| QUARTER | → | FULL |
|---|---|---|
| 1 | → | 1 |
| 2 | → | 5 |
| 3 | → | 5 |
| 4 | → | 5 |
| 5 | → | 5 |
| 6 | → | 9 |
| 7 | → | 9 |
| 8 | → | 9 |
| 9 | → | 9 |
| 10 | → | 13 |
| 11 | → | 13 |
| 12 | → | 13 |
| 13 | → | 13 |
| 14 | → | 1 |
| 15 | → | 1 |
| 16 | → | 1 |

FIG. 12C

CWCCW=H

| QUARTER | → | FULL |
|---|---|---|
| 1 | → | 1 |
| 2 | → | 1 |
| 3 | → | 1 |
| 4 | → | 1 |
| 5 | → | 5 |
| 6 | → | 5 |
| 7 | → | 5 |
| 8 | → | 5 |
| 9 | → | 9 |
| 10 | → | 9 |
| 11 | → | 9 |
| 12 | → | 9 |
| 13 | → | 13 |
| 14 | → | 13 |
| 15 | → | 13 |
| 16 | → | 13 |

FIG. 13A

CWCCW=H/L

| HALF | → | QUARTER |
|---|---|---|
| 1 | → | 1 |
| 3 | → | 3 |
| 4 | → | 5 |
| 7 | → | 7 |
| 9 | → | 9 |
| 11 | → | 11 |
| 13 | → | 13 |
| 15 | → | 15 |

FIG. 13B

CWCCW=L

| QUARTER | → | HALF |
|---|---|---|
| 1 | → | 1 |
| 2 | → | 3 |
| 3 | → | 3 |
| 4 | → | 5 |
| 5 | → | 5 |
| 6 | → | 7 |
| 7 | → | 7 |
| 8 | → | 9 |
| 9 | → | 9 |
| 10 | → | 1 |
| 11 | → | 1 |
| 12 | → | 13 |
| 13 | → | 13 |
| 14 | → | 15 |
| 15 | → | 15 |
| 16 | → | 1 |

FIG. 13C

CWCCW=H

| QUARTER | → | HALF |
|---|---|---|
| 1 | → | 1 |
| 2 | → | 1 |
| 3 | → | 3 |
| 4 | → | 3 |
| 5 | → | 5 |
| 6 | → | 5 |
| 7 | → | 7 |
| 8 | → | 7 |
| 9 | → | 9 |
| 10 | → | 9 |
| 11 | → | 11 |
| 12 | → | 11 |
| 13 | → | 13 |
| 14 | → | 13 |
| 15 | → | 15 |
| 16 | → | 15 |

FIG. 15A

CWCCW=L

| COUNT | CURRENT STATE (OUTPUT VALUE OF THE SHIFT REGISTER 15) | | | | EXCITATION POINT | → | NEXT STATE (OUTPUT VALUE OF THE DECODER 13) | | | | EXCITATION POINT |
|---|---|---|---|---|---|---|---|---|---|---|---|
| | Q3 | Q2 | Q1 | Q0 | | | QQ3 | QQ2 | QQ1 | QQ0 | |
| 0 | 0 | 0 | 0 | 0 | ① | → | 0 | 0 | 0 | 1 | ② |
| 1 | 0 | 0 | 0 | 1 | ② | → | 0 | 0 | 1 | 0 | ③ |
| 2 | 0 | 0 | 1 | 0 | ③ | → | 0 | 0 | 1 | 1 | ④ |
| 3 | 0 | 0 | 1 | 1 | ④ | → | 0 | 1 | 0 | 0 | ⑤ |
| 4 | 0 | 1 | 0 | 0 | ⑤ | → | 0 | 1 | 0 | 1 | ⑥ |
| 5 | 0 | 1 | 0 | 1 | ⑥ | → | 0 | 1 | 1 | 0 | ⑦ |
| 6 | 0 | 1 | 1 | 0 | ⑦ | → | 0 | 1 | 1 | 1 | ⑧ |
| 7 | 0 | 1 | 1 | 1 | ⑧ | → | 1 | 0 | 0 | 0 | ⑨ |
| 8 | 1 | 0 | 0 | 0 | ⑨ | → | 1 | 0 | 0 | 1 | ⑩ |
| 9 | 1 | 0 | 0 | 1 | ⑩ | → | 1 | 0 | 1 | 0 | ⑪ |
| 10 | 1 | 0 | 1 | 0 | ⑪ | → | 1 | 0 | 1 | 1 | ⑫ |
| 11 | 1 | 0 | 1 | 1 | ⑫ | → | 1 | 1 | 0 | 0 | ⑬ |
| 12 | 1 | 1 | 0 | 0 | ⑬ | → | 1 | 1 | 0 | 1 | ⑭ |
| 13 | 1 | 1 | 0 | 1 | ⑭ | → | 1 | 1 | 1 | 0 | ⑮ |
| 14 | 1 | 1 | 1 | 0 | ⑮ | → | 1 | 1 | 1 | 1 | ⑯ |
| 15 | 1 | 1 | 1 | 1 | ⑯ | → | 0 | 0 | 0 | 0 | ① |

FIG. 15B

CWCCW=H

| COUNT | CURRENT STATE (OUTPUT VALUE OF THE SHIFT REGISTER 15) | | | | EXCITATION POINT | → | NEXT STATE (OUTPUT VALUE OF THE DECODER 13) | | | | EXCITATION POINT |
|---|---|---|---|---|---|---|---|---|---|---|---|
| | Q3 | Q2 | Q1 | Q0 | | | QQ3 | QQ2 | QQ1 | QQ0 | |
| 0 | 0 | 0 | 0 | 0 | ① | → | 1 | 1 | 1 | 1 | ⑯ |
| 15 | 1 | 1 | 1 | 1 | ⑯ | → | 1 | 1 | 1 | 0 | ⑮ |
| 14 | 1 | 1 | 1 | 0 | ⑮ | → | 1 | 1 | 0 | 1 | ⑭ |
| 13 | 1 | 1 | 0 | 1 | ⑭ | → | 1 | 1 | 0 | 0 | ⑬ |
| 12 | 1 | 1 | 0 | 0 | ⑬ | → | 1 | 0 | 1 | 1 | ⑫ |
| 11 | 1 | 0 | 1 | 1 | ⑫ | → | 1 | 0 | 1 | 0 | ⑪ |
| 10 | 1 | 0 | 1 | 0 | ⑪ | → | 1 | 0 | 0 | 1 | ⑩ |
| 9 | 1 | 0 | 0 | 1 | ⑩ | → | 1 | 0 | 0 | 0 | ⑨ |
| 8 | 1 | 0 | 0 | 0 | ⑨ | → | 0 | 1 | 1 | 1 | ⑧ |
| 7 | 0 | 1 | 1 | 1 | ⑧ | → | 0 | 1 | 1 | 0 | ⑦ |
| 6 | 0 | 1 | 1 | 0 | ⑦ | → | 0 | 1 | 0 | 1 | ⑥ |
| 5 | 0 | 1 | 0 | 1 | ⑥ | → | 0 | 1 | 0 | 0 | ⑤ |
| 4 | 0 | 1 | 0 | 0 | ⑤ | → | 0 | 0 | 1 | 1 | ④ |
| 3 | 0 | 0 | 1 | 1 | ④ | → | 0 | 0 | 1 | 0 | ③ |
| 2 | 0 | 0 | 1 | 0 | ③ | → | 0 | 0 | 0 | 1 | ② |
| 1 | 0 | 0 | 0 | 1 | ② | → | 0 | 0 | 0 | 0 | ① |

FIG. 16A

CWCCW=L

| COUNT | CURRENT STATE (OUTPUT VALUE OF THE SHIFT REGISTER 15) | | | | EXCITATION POINT | → | NEXT STATE (OUTPUT VALUE OF THE DECODER 12) | | | | EXCITATION POINT |
|---|---|---|---|---|---|---|---|---|---|---|---|
| | Q3 | Q2 | Q1 | Q0 | | | QH3 | QH2 | QH1 | QH0 | |
| 0 | 0 | 0 | 0 | 0 | ① | → | 0 | 0 | 1 | 0 | ③ |
| 1 | 0 | 0 | 0 | 1 | ③ | → | 0 | 1 | 0 | 0 | ⑤ |
| 2 | 0 | 0 | 1 | 0 | ③ | → | 0 | 1 | 0 | 0 | ⑤ |
| 3 | 0 | 0 | 1 | 1 | ⑤ | → | 0 | 1 | 1 | 0 | ⑦ |
| 4 | 0 | 1 | 0 | 0 | ⑤ | → | 0 | 1 | 1 | 0 | ⑦ |
| 5 | 0 | 1 | 0 | 1 | ⑦ | → | 1 | 0 | 0 | 0 | ⑨ |
| 6 | 0 | 1 | 1 | 0 | ⑦ | → | 1 | 0 | 0 | 0 | ⑨ |
| 7 | 0 | 1 | 1 | 1 | ⑨ | → | 1 | 0 | 1 | 0 | ⑪ |
| 8 | 1 | 0 | 0 | 0 | ⑨ | → | 1 | 0 | 1 | 0 | ⑪ |
| 9 | 1 | 0 | 0 | 1 | ⑪ | → | 1 | 1 | 0 | 0 | ⑬ |
| 10 | 1 | 0 | 1 | 0 | ⑪ | → | 1 | 1 | 0 | 0 | ⑬ |
| 11 | 1 | 0 | 1 | 1 | ⑬ | → | 1 | 1 | 1 | 0 | ⑮ |
| 12 | 1 | 1 | 0 | 0 | ⑬ | → | 1 | 1 | 1 | 0 | ⑮ |
| 13 | 1 | 1 | 0 | 1 | ⑮ | → | 0 | 0 | 0 | 0 | ① |
| 14 | 1 | 1 | 1 | 0 | ⑮ | → | 0 | 0 | 0 | 0 | ① |
| 15 | 1 | 1 | 1 | 1 | ① | → | 0 | 0 | 1 | 0 | ③ |

FIG. 16B

CWCCW=H

| COUNT | CURRENT STATE (OUTPUT VALUE OF THE SHIFT REGISTER 15) | | | | EXCITATION POINT | → | NEXT STATE (OUTPUT VALUE OF THE DECODER 12) | | | | EXCITATION POINT |
|---|---|---|---|---|---|---|---|---|---|---|---|
| | Q3 | Q2 | Q1 | Q0 | | | QH3 | QH2 | QH1 | QH0 | |
| 0 | 0 | 0 | 0 | 0 | ① | → | 1 | 1 | 1 | 0 | ⑮ |
| 15 | 1 | 1 | 1 | 1 | ⑮ | → | 1 | 1 | 0 | 0 | ⑬ |
| 14 | 1 | 1 | 1 | 0 | ⑮ | → | 1 | 1 | 0 | 0 | ⑬ |
| 13 | 1 | 1 | 0 | 1 | ⑬ | → | 1 | 0 | 1 | 0 | ⑪ |
| 12 | 1 | 1 | 0 | 0 | ⑬ | → | 1 | 0 | 1 | 0 | ⑪ |
| 11 | 1 | 0 | 1 | 1 | ⑪ | → | 1 | 0 | 0 | 0 | ⑨ |
| 10 | 1 | 0 | 1 | 0 | ⑪ | → | 1 | 0 | 0 | 0 | ⑨ |
| 9 | 1 | 0 | 0 | 1 | ⑨ | → | 0 | 1 | 1 | 0 | ⑦ |
| 8 | 1 | 0 | 0 | 0 | ⑨ | → | 0 | 1 | 1 | 0 | ⑦ |
| 7 | 0 | 1 | 1 | 1 | ⑦ | → | 0 | 1 | 0 | 0 | ⑤ |
| 6 | 0 | 1 | 1 | 0 | ⑦ | → | 0 | 1 | 0 | 0 | ⑤ |
| 5 | 0 | 1 | 0 | 1 | ⑤ | → | 0 | 0 | 1 | 0 | ③ |
| 4 | 0 | 1 | 0 | 0 | ⑤ | → | 0 | 0 | 1 | 0 | ③ |
| 3 | 0 | 0 | 1 | 1 | ③ | → | 0 | 0 | 0 | 0 | ① |
| 2 | 0 | 0 | 1 | 0 | ③ | → | 0 | 0 | 0 | 0 | ① |
| 1 | 0 | 0 | 0 | 1 | ① | → | 1 | 1 | 1 | 0 | ⑮ |

FIG. 17A

CWCCW=L

| COUNT | CURRENT STATE (OUTPUT VALUE OF THE SHIFT REGISTER 15) | | | | EXCITATION POINT | → | NEXT STATE (OUTPUT VALUE OF THE DECODER 11) | | | | EXCITATION POINT |
|---|---|---|---|---|---|---|---|---|---|---|---|
| | Q3 | Q2 | Q1 | Q0 | | | QF3 | QF2 | QF1 | QF0 | |
| 0 | 0 | 0 | 0 | 0 | ① | → | 0 | 1 | 0 | 0 | ⑤ |
| 1 | 0 | 0 | 0 | 1 | ⑤ | → | 1 | 0 | 0 | 0 | ⑨ |
| 2 | 0 | 0 | 1 | 0 | ⑤ | → | 1 | 0 | 0 | 0 | ⑨ |
| 3 | 0 | 0 | 1 | 1 | ⑤ | → | 1 | 0 | 0 | 0 | ⑨ |
| 4 | 0 | 1 | 0 | 0 | ⑤ | → | 1 | 0 | 0 | 0 | ⑨ |
| 5 | 0 | 1 | 0 | 1 | ⑨ | → | 1 | 1 | 0 | 0 | ⑬ |
| 6 | 0 | 1 | 1 | 0 | ⑨ | → | 1 | 1 | 0 | 0 | ⑬ |
| 7 | 0 | 1 | 1 | 1 | ⑨ | → | 1 | 1 | 0 | 0 | ⑬ |
| 8 | 1 | 0 | 0 | 0 | ⑨ | → | 1 | 1 | 0 | 0 | ⑬ |
| 9 | 1 | 0 | 0 | 1 | ⑬ | → | 0 | 0 | 0 | 0 | ① |
| 10 | 1 | 0 | 1 | 0 | ⑬ | → | 0 | 0 | 0 | 0 | ① |
| 11 | 1 | 0 | 1 | 1 | ⑬ | → | 0 | 0 | 0 | 0 | ① |
| 12 | 1 | 1 | 0 | 0 | ⑬ | → | 0 | 0 | 0 | 0 | ① |
| 13 | 1 | 1 | 0 | 1 | ① | → | 0 | 1 | 0 | 0 | ⑤ |
| 14 | 1 | 1 | 1 | 0 | ① | → | 0 | 1 | 0 | 0 | ⑤ |
| 15 | 1 | 1 | 1 | 1 | ① | → | 0 | 1 | 0 | 0 | ⑤ |

FIG. 17B

CWCCW=H

| COUNT | CURRENT STATE (OUTPUT VALUE OF THE SHIFT REGISTER 15) | | | | EXCITATION POINT | → | NEXT STATE (OUTPUT VALUE OF THE DECODER 11) | | | | EXCITATION POINT |
|---|---|---|---|---|---|---|---|---|---|---|---|
| | Q3 | Q2 | Q1 | Q0 | | | QF3 | QF2 | QF1 | QF0 | |
| 0 | 0 | 0 | 0 | 0 | ① | → | 1 | 1 | 0 | 0 | ⑬ |
| 15 | 1 | 1 | 1 | 1 | ⑬ | → | 1 | 0 | 0 | 0 | ⑨ |
| 14 | 1 | 1 | 1 | 0 | ⑬ | → | 1 | 0 | 0 | 0 | ⑨ |
| 13 | 1 | 1 | 0 | 1 | ⑬ | → | 1 | 0 | 0 | 0 | ⑨ |
| 12 | 1 | 1 | 0 | 0 | ⑬ | → | 1 | 0 | 0 | 0 | ⑨ |
| 11 | 1 | 0 | 1 | 1 | ⑨ | → | 0 | 1 | 0 | 0 | ⑤ |
| 10 | 1 | 0 | 1 | 0 | ⑨ | → | 0 | 1 | 0 | 0 | ⑤ |
| 9 | 1 | 0 | 0 | 1 | ⑨ | → | 0 | 1 | 0 | 0 | ⑤ |
| 8 | 1 | 0 | 0 | 0 | ⑨ | → | 0 | 1 | 0 | 0 | ⑤ |
| 7 | 0 | 1 | 1 | 1 | ⑤ | → | 0 | 0 | 0 | 0 | ① |
| 6 | 0 | 1 | 1 | 0 | ⑤ | → | 0 | 0 | 0 | 0 | ① |
| 5 | 0 | 1 | 0 | 1 | ⑤ | → | 0 | 0 | 0 | 0 | ① |
| 4 | 0 | 1 | 0 | 0 | ⑤ | → | 0 | 0 | 0 | 0 | ① |
| 3 | 0 | 0 | 1 | 1 | ① | → | 1 | 1 | 0 | 0 | ⑬ |
| 2 | 0 | 0 | 1 | 0 | ① | → | 1 | 1 | 0 | 0 | ⑬ |
| 1 | 0 | 0 | 0 | 1 | ① | → | 1 | 1 | 0 | 0 | ⑬ |

FIG. 18

| CWCCW=L/H | | QUARTER | | | | |
|---|---|---|---|---|---|---|
| EXCITATION POINT | CLK NUMBER | Q3 | Q2 | Q1 | Q0 | |
| ① | 0 | 0 | 0 | 0 | 0 | ○ |
| ② | 1 | 0 | 0 | 0 | 1 | ○ |
| ③ | 2 | 0 | 0 | 1 | 0 | ○ |
| ④ | 3 | 0 | 0 | 1 | 1 | ○ |
| ⑤ | 4 | 0 | 1 | 0 | 0 | ○ |
| ⑥ | 5 | 0 | 1 | 0 | 1 | ○ |
| ⑦ | 6 | 0 | 1 | 1 | 0 | ○ |
| ⑧ | 7 | 0 | 1 | 1 | 1 | ○ |
| ⑨ | 8 | 1 | 0 | 0 | 0 | ○ |
| ⑩ | 9 | 1 | 0 | 0 | 1 | ○ |
| ⑪ | 10 | 1 | 0 | 1 | 0 | ○ |
| ⑫ | 11 | 1 | 0 | 1 | 1 | ○ |
| ⑬ | 12 | 1 | 1 | 0 | 0 | ○ |
| ⑭ | 13 | 1 | 1 | 0 | 1 | ○ |
| ⑮ | 14 | 1 | 1 | 1 | 0 | ○ |
| ⑯ | 15 | 1 | 1 | 1 | 1 | ○ |

FIG. 19

| CWCCW=L | | CWCCW=H | | HALF | | | | |
|---|---|---|---|---|---|---|---|---|
| EXCITATION POINT | CLK NUMBER | EXCITATION POINT | CLK NUMBER | Q3 | Q2 | Q1 | Q0 | |
| ① | 0 | ① | 0 | 0 | 0 | 0 | 0 | ○ |
| ③ | 1 |  |  | 0 | 0 | 0 | 1 | |
|  |  | ③ | 1 | 0 | 0 | 1 | 0 | ○ |
| ⑤ | 2 |  |  | 0 | 0 | 1 | 1 | |
|  |  | ⑤ | 2 | 0 | 1 | 0 | 0 | ○ |
| ⑦ | 3 |  |  | 0 | 1 | 0 | 1 | |
|  |  | ⑦ | 3 | 0 | 1 | 1 | 0 | ○ |
| ⑨ | 4 |  |  | 0 | 1 | 1 | 1 | |
|  |  | ⑨ | 4 | 1 | 0 | 0 | 0 | ○ |
| ⑪ | 5 |  |  | 1 | 0 | 0 | 1 | |
|  |  | ⑪ | 5 | 1 | 0 | 1 | 0 | ○ |
| ⑬ | 6 |  |  | 1 | 0 | 1 | 1 | |
|  |  | ⑬ | 6 | 1 | 1 | 0 | 0 | ○ |
| ⑮ | 7 |  |  | 1 | 1 | 0 | 1 | |
|  |  | ⑮ | 7 | 1 | 1 | 1 | 0 | ○ |
| ① | 0 |  |  | 1 | 1 | 1 | 1 | |

FIG. 20

| CWCCW=L | | CWCCW=H | | FULL | | | | |
|---|---|---|---|---|---|---|---|---|
| EXCITATION POINT | CLK NUMBER | EXCITATION POINT | CLK NUMBER | Q3 | Q2 | Q1 | Q0 | |
| ① | 0 | ① | 0 | 0 | 0 | 0 | 0 | ○ |
| ⑤ | 1 | | | 0 | 0 | 0 | 1 | |
| | | | | 0 | 0 | 1 | 0 | |
| | | | | 0 | 0 | 1 | 1 | |
| ⑨ | 2 | ⑤ | 1 | 0 | 1 | 0 | 0 | ○ |
| | | | | 0 | 1 | 0 | 1 | |
| | | | | 0 | 1 | 1 | 0 | |
| | | | | 0 | 1 | 1 | 1 | |
| ⑬ | 3 | ⑨ | 2 | 1 | 0 | 0 | 0 | ○ |
| | | | | 1 | 0 | 0 | 1 | |
| | | | | 1 | 0 | 1 | 0 | |
| | | | | 1 | 0 | 1 | 1 | |
| ① | 0 | ⑬ | 3 | 1 | 1 | 0 | 0 | ○ |
| | | | | 1 | 1 | 0 | 1 | |
| | | | | 1 | 1 | 1 | 0 | |
| | | | | 1 | 1 | 1 | 1 | |

FIG. 21A

CWCCW=L

| COUNT | Q3 | Q2 | Q1 | Q0 | EXCITATION POINT (PRIOR ART) | | | EXCITATION POINT (PRESENT INVENTION) | | |
|---|---|---|---|---|---|---|---|---|---|---|
| | | | | | QUARTER | HALF | FULL | QUARTER | HALF | FULL |
| 0 | 0 | 0 | 0 | 0 | ① | ① | ① | ① | ① | ① |
| 1 | 0 | 0 | 0 | 1 | ② | ③ | ⑤ | ② | — | — |
| 2 | 0 | 0 | 1 | 0 | ③ | ⑤ | ⑨ | ③ | ③ | — |
| 3 | 0 | 0 | 1 | 1 | ④ | ⑦ | ⑬ | ④ | — | — |
| 4 | 0 | 1 | 0 | 0 | ⑤ | ⑨ | ① | ⑤ | ⑤ | ⑤ |
| 5 | 0 | 1 | 0 | 1 | ⑥ | ⑪ | ⑤ | ⑥ | — | — |
| 6 | 0 | 1 | 1 | 0 | ⑦ | ⑬ | ⑨ | ⑦ | ⑦ | — |
| 7 | 0 | 1 | 1 | 1 | ⑧ | ⑮ | ⑬ | ⑧ | — | — |
| 8 | 1 | 0 | 0 | 0 | ⑨ | ① | ① | ⑨ | ⑨ | ⑨ |
| 9 | 1 | 0 | 0 | 1 | ⑩ | ③ | ⑤ | ⑩ | — | — |
| 10 | 1 | 0 | 1 | 0 | ⑪ | ⑤ | ⑨ | ⑪ | ⑪ | — |
| 11 | 1 | 0 | 1 | 1 | ⑫ | ⑦ | ⑬ | ⑫ | — | — |
| 12 | 1 | 1 | 0 | 0 | ⑬ | ⑨ | ① | ⑬ | ⑬ | ⑬ |
| 13 | 1 | 1 | 0 | 1 | ⑭ | ⑪ | ⑤ | ⑭ | — | — |
| 14 | 1 | 1 | 1 | 0 | ⑮ | ⑬ | ⑨ | ⑮ | ⑮ | — |
| 15 | 1 | 1 | 1 | 1 | ⑯ | ⑮ | ⑬ | ⑯ | — | — |

FIG. 21B

CWCCW=H

| COUNT | Q3 | Q2 | Q1 | Q0 | EXCITATION POINT (PRIOR ART) | | | EXCITATION POINT (PRESENT INVENTION) | | |
|---|---|---|---|---|---|---|---|---|---|---|
| | | | | | QUARTER | HALF | FULL | QUARTER | HALF | FULL |
| 0 | 0 | 0 | 0 | 0 | ① | ① | ① | ① | ① | ① |
| 15 | 1 | 1 | 1 | 1 | ⑯ | ⑮ | ⑬ | ⑯ | — | — |
| 14 | 1 | 1 | 1 | 0 | ⑮ | ⑬ | ⑨ | ⑮ | ⑮ | — |
| 13 | 1 | 1 | 0 | 1 | ⑭ | ⑪ | ⑤ | ⑭ | — | — |
| 12 | 1 | 1 | 0 | 0 | ⑬ | ⑨ | ① | ⑬ | ⑬ | ⑬ |
| 11 | 1 | 0 | 1 | 1 | ⑫ | ⑦ | ⑬ | ⑫ | — | — |
| 10 | 1 | 0 | 1 | 0 | ⑪ | ⑤ | ⑨ | ⑪ | ⑪ | — |
| 9 | 1 | 0 | 0 | 1 | ⑩ | ③ | ⑤ | ⑩ | — | — |
| 8 | 1 | 0 | 0 | 0 | ⑨ | ① | ① | ⑨ | ⑨ | ⑨ |
| 7 | 0 | 1 | 1 | 1 | ⑧ | ⑮ | ⑬ | ⑧ | — | — |
| 6 | 0 | 1 | 1 | 0 | ⑦ | ⑬ | ⑨ | ⑦ | ⑦ | — |
| 5 | 0 | 1 | 0 | 1 | ⑥ | ⑪ | ⑤ | ⑥ | — | — |
| 4 | 0 | 1 | 0 | 0 | ⑤ | ⑨ | ① | ⑤ | ⑤ | ⑤ |
| 3 | 0 | 0 | 1 | 1 | ④ | ⑦ | ⑬ | ④ | — | — |
| 2 | 0 | 0 | 1 | 0 | ③ | ⑤ | ⑨ | ③ | ③ | — |
| 1 | 0 | 0 | 0 | 1 | ② | ③ | ⑤ | ② | — | — |

MOTOR DRIVE DEVICE AND ELECTRONIC DEVICE THAT USES THE SAME

CROSS-REFERENCE TO RELATED APPLICATIONS

This application is based on Japanese Patent Application No. 2009-148894 filed on Jun. 23, 2009, the contents of which are hereby incorporated by reference.

BACKGROUND OF THE INVENTION

1. Field of the Invention

The present invention relates to a motor drive device for controlling the driving of a stepping motor, and to an electronic device that uses the motor drive device.

2. Description of Related Art

Excitation methods (excitation modes) for stepping motors include the W1-2-phase excitation method, the 1-2-phase excitation method, the 2-phase excitation method, and other methods. The W1-2-phase excitation method is an excitation method whereby the rotation angle per step can be controlled more finely than the basic step angle by controlling the excitation current that flows to the motor coil, and is referred to as a "micro-step drive method." The rotation angle per step in the W1-2-phase excitation method is ½ the rotation angle per step produced by the 1-2-phase excitation method, and ¼ the rotation angle per step produced by the 2-phase excitation method. The 2-phase excitation method, 1-2-phase excitation method, and W1-2-phase excitation method are therefore also referred to as the "full-step drive method," the "half-step drive method," and the "quarter-step drive method," respectively.

In a case in which a stepping motor is driven by the W1-2-phase excitation method, the types (input method) of control signals inputted to a controller (current chopper circuit) for controlling the excitation current are classified broadly into two types, the so-called "clock input method" and "parallel input method."

In the case of the clock input method, four types of control signals (a clock signal CLK, a rotation direction switching signal CWCCW, and excitation method switching signals MODE0/MODE1 (hereinafter referred to as the excitation method switching signal MODE as appropriate)), for example, are inputted to the controller. The clock signal CLK is a control signal that is driven in pulses at a predetermined frequency, and the controller causes the stepping motor to rotate by a predetermined step angle (rotation angle per step) at each rise (or fall) of the clock signal CLK pulse. The rotation direction switching signal CWCCW is a control signal for indicating whether to drive the stepping motor in the positive rotation direction (clockwise: CW) or the negative rotation direction (counterclockwise: CCW). The excitation method switching signal MODE is a control signal for indicating the excitation method of the stepping motor.

The excitation method switching signal MODE and rotation direction switching signal CWCCW described above correspond to control signals for indicating the rotation angle (i.e., the per-step rotation angle (=step angle)) of the stepping motor per unit time, and the clock signal CLK corresponds to a control signal for indicating the units of time (drive period of the stepping motor). However, the rotation direction switching signal CWCCW is not an essential control signal in cases in which switching of the rotation direction is not controlled.

In a case in which the parallel input method is followed, six types of control signals (a first polarity signal PH1, a second polarity signal PH2, first current amount signals I01/I11, and second current amount signals I02, I12), for example, are inputted to the controller. The first polarity signal PH1 is a control signal for indicating the polarity of a first excitation current that flows to the motor coil in a first excitation phase, and the second polarity signal PH2 is a control signal for indicating the polarity of a second excitation current that flows to the motor coil in a second excitation phase. The first current amount signals I01/I11 are control signals for indicating the amount of the first excitation current, and the second current amount signals I02/I12 are control signals for indicating the amount of the second excitation current. Specifically, the polarity and amount (level) of the first excitation current are determined by the combination of the first polarity signal PH1 and the first current amount signal I01/I11, and the polarity and amount (level) of the second excitation current are determined by the combination of the second polarity signal PH2 and the second current amount signals I02/I12.

Japanese Laid-open Patent Publication No. 2008-29146 (hereinafter referred to as Patent Document 1) by the present applicant can be cited as an example of a conventional technique that relates to the above description. Patent Document 1 discloses a motor drive device provided with a signal generator for generating a parallel-input-method control signal DVS from a clock-input-method control signal INS.

The conventional structure of the abovementioned signal generator will be described. FIG. 25 is a block diagram showing an example of the conventional signal generator. As shown in FIG. 25, the conventionally configured signal generator is composed of a counter unit X10 and a decoder unit X20.

The counter unit X10 is a means for counting the number of pulses of the clock signal CLK and outputting the count value as a 4-bit output signal Q (and inverted output signal QB; the same hereinafter) to the decoder unit X20, and is composed of a decoder X11 and a shift register X12. Clock-input-method control signals INS inputted to the counter unit X10 include the clock signal CLK as well as the rotation direction switching signal CWCCW and an enable signal ENABLE.

The decoder X11 determines a stored value of the shift register X12 in accordance with the output signal Q inputted as feedback from the shift register X12, and in accordance with the rotation direction switching signal CWCCW inputted from the outside. For example, when the rotation direction switching signal CWCCW is at a logical level for specifying positive rotation of the motor, the decoder X11 increments the then-current value of the output signal Q once and stores the value in the shift register X12 ("0" is stored when the current value of the output signal Q is "15"), and when the rotation direction switching signal CWCCW is at a logical level for specifying negative rotation of the motor, the decoder X11 decrements the then-current value of the output signal Q once and stores the value in the shift register X12 ("15" is stored when the current value of the output signal Q is "0"). The shift register X12 outputs the stored value thereof as the output signal Q at each rise (or fall) of the clock signal CLK.

The decoder unit X20 is a means for generating parallel-input-method control signals DVS (first polarity signal PH1, second polarity signal PH2, first current amount signals I01/I11, and second current amount signals I02/I12) on the basis of the output signal Q inputted from the counter unit X10 and the excitation method switching signals MODE0/MODE1 inputted from the outside, and is composed of a decoder X21 and a selector X22. Clock-input-method control signals INS inputted to the decoder unit X20 include the excitation method switching signals MODE0/MODE1 as well as the enable signal ENABLE.

The decoder X21 includes a decoder X211 for full-step driving, a decoder X212 for half-step driving, and a decoder X213 for quarter-step driving, and these decoders generate parallel-input-method control signals DF, DH, DQ, respectively, in accordance with the output signal Q. Based on the excitation method switching signal MODE, the selector X22 selects any one of the control signals DF, DH, DQ inputted from the decoder X21 and outputs the selected signal as the control signal DVS to a controller of a subsequent stage (not shown in FIG. 25).

FIGS. 26A, 26B, and 26C are torque vector diagrams for the full-step drive method, the half-step drive method, and the quarter-step drive method, respectively. The numbers associated with the arrows in each diagram indicate the output signal Q (number of pulses of the clock signal CLK) of the counter unit X10. As is apparent from these diagrams, the step angles of the motor in the full-step drive method, the half-step drive method, and the quarter-step drive method are 90°, 45°, and 22.5°, respectively, in terms of electrical angle.

However, in the signal generator of the conventional configuration shown in FIG. 25, the counter unit X10 has only one decoder X11 for counting the number of pulses of the clock signal CLK, the decoder unit X20 has only one decoder X211, decoder X212, and decoder X213 for each of full-step driving, half-step driving, and quarter-step driving, respectively, as decoders X21 corresponding to the output signal Q of the counter unit X10, and no provision is made with regard to the rotation angle (positive rotation/negative rotation) of the motor.

Therefore, in the motor drive device provided with a signal generator in accordance with the conventional configuration described above, the correlation between the output signal Q (number of pulses of the clock signal CLK) of the counter unit X10 and the phase (excitation point) of the torque vector is fundamentally inconsistent between the different excitation methods, as is apparent by comparing FIGS. 26A, 26B, and 26C, and when the excitation method is switched during driving of the motor, the torque vector of the motor is transitioned to an unintended phase, which can cause problems with the stepping operation of the motor.

FIG. 27 is a torque vector diagram showing the problems that occur during switching of the excitation method. For example, in a state in which the motor is step-driven in the positive rotation direction by the full-step drive method, and the output signal Q of the counter unit X10 is "8," the phase of the torque vector turns 180° in terms of electrical angle as shown in the drawing in a case in which the excitation method of the motor is switched to the quarter-step drive method. When the torque vector of the motor has such a large transition to an unintended phase, the smooth rotation of the motor is adversely affected by missteps, and vibration due to hunting, motor stoppage due to power swing, and other problems can occur.

When the excitation method of the motor is switched to the full-step drive method in a state in which the motor is step-driven in the positive rotation direction by the quarter-step drive method, and the output signal Q of the counter unit X10 is "14," since the phase of the torque vector turns −135° in terms of electrical angle (compare FIGS. 26A and 26C), negative rotation of the motor can occur during switching of the excitation method.

SUMMARY OF THE INVENTION

In view of the foregoing problems, an object of the present invention is to provide a motor drive device capable of suppressing motor vibration and missteps due to switching the excitation method during driving of the motor, and to provide an electronic device that uses the motor drive device.

The motor drive device according to a first aspect of the present invention for achieving the abovementioned objects is a motor drive device comprising a signal generator for generating control signals of a second input method that include a polarity signal for indicating the polarity of an excitation current that flows to a motor, and a current amount signal for indicating the amount of the excitation current, from control signals of a first input method that include a clock signal for indicating a stepping drive period of the motor, and an excitation method switching signal for indicating an excitation method of the motor; and a drive unit for step-driving the motor on the basis of the control signals of the second input method that are generated by the signal generator; wherein the signal generator generates control signals of the second input method from the control signals of the first input method and controls the torque vector of the motor so that the correlation between the number of pulses of the clock signal and the phase of the torque vector of the motor is held in common for all the excitation methods, with the excitation method having the greatest number of steps being used as a reference, that the torque vector of the motor as a rule is maintained in the same phase as before switching when the excitation method is switched, and that the torque vector is in the closest phase in the rotation direction of the motor in a case in which there is no phase that is the same as the phase prior to switching.

A second aspect of the motor drive device is the motor drive device according to the first aspect, wherein the signal generator comprises a counter unit for counting the number of pulses of the clock signal; and a decoder unit for generating control signals of the second input method on the basis of an output signal of the counter unit and the excitation method switching signal.

A third aspect of the motor drive device is the motor drive device according to the second aspect, wherein the counter unit comprises a plurality of internal count decoders for generating an internal count signal for each excitation method in accordance with the fed-back output signal of the counter unit; an internal count selector for selecting any one of the plurality of internal count signals in accordance with the excitation method switching signal; and a register for storing the internal count signal selected by the internal count selector and outputting the stored value as the output signal of the counter unit in accordance with the clock signal.

The motor drive device according to a fourth aspect is the motor drive device according to the third aspect, wherein the decoder unit comprises a plurality of excitation point specification decoders for generating excitation point specification signals for specifying the phase of the torque vector of the motor for each excitation method in accordance with the output signal of the counter unit; and an excitation point specification selector for selecting any one of the plurality of excitation point specification signals in accordance with the excitation method switching signal.

The motor drive device according to a fifth aspect is the motor drive device according to the fourth aspect, wherein the plurality of internal count decoders switch between incrementing and decrementing the internal count signal in accordance with a rotation direction switching signal for indicating the rotation direction of the motor; and the decoder unit has a positive-rotation decoder for generating an excitation point specification signal for specifying the phase of the torque vector during positive rotation of the motor, with the plurality of excitation point specification decoders and the excitation point specification selector constituting a set; a negative-rotation decoder for generating an excitation point specification signal for specifying the phase of the torque vector during negative rotation of the motor, with the plurality of excitation point specification decoders and the excitation point specification selector constituting a set; and a rotation direction switching selector for selecting any one of the excitation point specification signal inputted from the positive-rotation decoder and the excitation point specification signal inputted from the negative-rotation decoder, in accordance with the rotation direction switching signal.

The motor drive device according to a sixth aspect is the motor drive device according to the fifth aspect, wherein the excitation point specification decoder that corresponds to the excitation method having the highest number of steps among the plurality of excitation point specification decoders is shared as a combination positive-rotation/negative-rotation decoder between the positive-rotation decoder and the negative-rotation decoder.

The motor drive device according to a seventh aspect is the motor drive device according to the fifth or sixth aspect, wherein the decoder unit has a synchronizing circuit for synchronizing the rotation direction switching signal with the clock signal.

The electronic device according to an eighth aspect of the present invention comprises the motor and the motor drive device according to any of the first through seventh aspects.

The motor drive device configured as described above and the electronic device that uses the motor drive device make it possible to suppress missteps or motor vibration caused by switching the excitation method during driving of the motor.

Other characteristics, elements, steps, merits, and properties of the present invention will become clearer from the detailed description of preferred embodiments below and the accompanying drawings.

BRIEF DESCRIPTION OF THE DRAWINGS

FIG. 11A is a table showing the change in the excitation point during switching of the excitation method (positive rotation/negative rotation, full→half);

FIG. 11B is a table showing the change in the excitation point during switching of the excitation method (positive rotation, half→full);

FIG. 11C is a table showing the change in the excitation point during switching of the excitation method (negative rotation, half→full);

FIG. 12A is a table showing the change in the excitation point during switching of the excitation method (positive rotation/negative rotation, full→) quarter);

FIG. 12B is a table showing the change in the excitation point during switching of the excitation method (positive rotation, quarter→full);

FIG. 12C is a table showing the change in the excitation point during switching of the excitation method (negative rotation, quarter→full);

FIG. 13A is a table showing the change in the excitation point during switching of the excitation method (positive rotation/negative rotation, half→quarter);

FIG. 13B is a table showing the change in the excitation point during switching of the excitation method (positive rotation, quarter→half);

FIG. 13C is a table showing the change in the excitation point during switching of the excitation method (negative rotation, quarter→half);

FIG. 15A is a table showing the correlation between the output signal Q and internal count signal QQ during positive rotation of the motor;

FIG. 15B is a table showing the correlation between the output signal Q and the internal count signal QQ during negative rotation of the motor;

FIG. 16A is a table showing the correlation between the output signal Q and internal count signal QH during positive rotation of the motor;

FIG. 16B is a table showing the correlation between the output signal Q and the internal count signal QH during negative rotation of the motor;

FIG. 17A is a table showing the correlation between the output signal Q and the internal count signal QF during positive rotation of the motor;

FIG. 17B is a table showing the correlation between the output signal Q and the internal count signal QF during negative rotation of the motor;

FIG. 18 is a truth table showing the correlation of the output signal Q, excitation point, and clock number for each case of positive rotation/negative rotation of the motor 4 (during quarter-step driving);

FIG. 19 is a truth table showing the correlation of the output signal Q, excitation point, and clock number for each case of positive rotation/negative rotation of the motor 4 (during half-step driving);

FIG. 20 is a truth table showing the correlation of the output signal Q, excitation point, and clock number for each case of positive rotation/negative rotation of the motor 4 (during full-step driving);

FIG. 21A is a table comparing the new and old excitation points with respect to the output signal Q (during positive rotation of the motor);

FIG. 21B is a table comparing the new and old excitation points with respect to the output signal Q (during negative rotation of the motor);

DETAILED DESCRIPTION OF PREFERRED EMBODIMENTS

Figure 1:
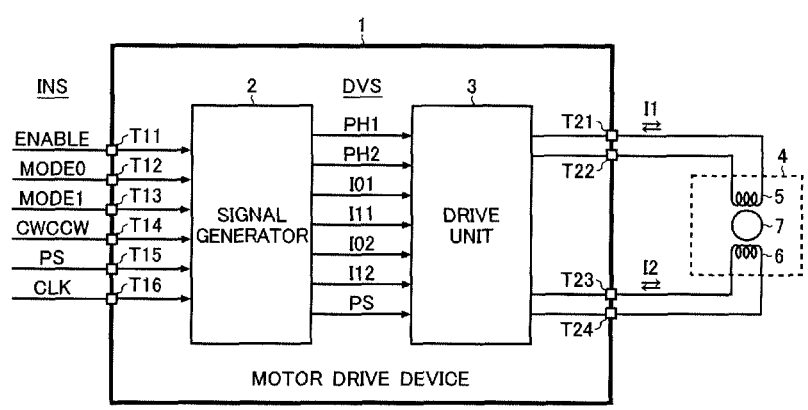
FIG. 1 is a block diagram showing an embodiment of the motor drive device according to the present invention.

FIG. 1 is a block diagram showing an embodiment of the motor drive device according to the present invention. The motor drive device 1 is a semiconductor integrated circuit device for controlling the driving of a stepping motor 4 (abbreviated as motor 4 hereinafter as appropriate) in accordance with control signals INS inputted from outside the device, and is composed of a signal generator 2 and a drive unit 3.

The signal generator 2 is a circuit block for generating control signals DVS of a parallel input method from the control signals INS of a clock input method and outputting the control signals DVS to the drive unit 3.

The control signals INS of the clock input method include an enable signal ENABLE, excitation method switching signals MODE0/MODE1 (hereinafter referred to as an excitation method switching signal MODE as appropriate), a rotation direction switching signal CWCCW, a reset signal PS, and a clock signal CLK, and these signals are inputted from outside the motor drive device 1 via external terminals T11 through T16, respectively.

The enable signal ENABLE is a control signal for allowing/prohibiting the operation of a counter unit 10 (and consequently, the operation of the motor drive device 1).

The excitation method switching signal MODE is a control signal for specifying the excitation method of the motor 4, and in the present embodiment, it is possible to selectively switch between any of a full-step drive method, a half-step drive method, and a quarter-step drive method. However, switching of the excitation method by the excitation method switching signal MODE should be performed in a state in which the rotation direction of the motor 4 is determined by the rotation direction switching signal CWCCW, and switching of the excitation method by the excitation method switching signal MODE and switching of the rotation direction by the rotation direction switching signal CWCCW should not be performed simultaneously.

The rotation direction switching signal CWCCW is a control signal for specifying whether to drive the motor 4 in the positive rotation direction (clockwise: CW) or the negative rotation direction (counterclockwise: CCW).

The reset signal PS is a control signal for initializing the operating state of the counter unit 10 or a decoder unit 20.

The clock signal CLK is a control signal that is driven in pulses at a predetermined frequency, and the drive unit 3 causes the motor 4 to rotate a predetermined step angle with each rise (or fall) of a pulse in the clock signal CLK. Specifically, the rotation speed of the motor 4 varies according to the frequency of the clock signal CLK.

Among the control signals INS described above, the excitation method switching signal MODE and the rotation direction switching signal CWCCW correspond to control signals for indicating the rotation angle (i.e., the per-step rotation angle (=step angle)) of the motor 4 per unit time, and the clock signal CLK corresponds to a control signal for indicating the units of time (stepping drive period of the motor 4). However, the rotation direction switching signal CWCCW is not an essential control signal in cases in which switching of the rotation direction is not controlled.

The control signals DVS of the parallel input method that are generated by the signal generator 2 include a first polarity signal PH1, a second polarity signal PH2, first current amount signals I01/I11, second current amount signals I02/I12, and a reset signal PS.

The first polarity signal PH1 is a control signal for indicating the polarity of a first excitation current I1 that flows to a motor coil 5 in a first excitation phase, and the second polarity signal PH2 is a control signal for indicating the polarity of a second excitation current I2 that flows to a motor coil 6 in a second excitation phase. The first current amount signals I01/I11 are control signals for indicating the amount of the first excitation current I1, and the second current amount signals I02/I12 are control signals for indicating the amount of the second excitation current I2.

Specifically, the polarity and amount (level) of the first excitation current I1 are determined by the combination of the first polarity signal PH1 and the first current amount signal I01/I11, and the polarity and amount (level) of the second excitation current I2 are determined by the combination of the second polarity signal PH2 and the second current amount signals I02/I12.

The reset signal PS is outputted to the drive unit 3 as well via the signal generator 2, and is used to initialize or forcibly stop the operating state in the drive unit 3.

The drive unit 3 generates the first excitation current I1 and the second excitation current I2 and feeds these currents to the motor coils 5, 6 so that the rotation of the motor 4 is controlled in accordance with the control signals DVS of the parallel input method that are inputted from the signal generator 2. The first excitation current I1 is fed to the motor coil 5 of the first excitation phase, which is connected between an external terminal T21 and an external terminal T22; and the second excitation current I2 is fed to the motor coil 6 of the second excitation phase, which is connected between an external terminal T23 and an external terminal T24. At this time, the drive unit 3 controls generation of the first excitation current I1 and second excitation current I2 so that the first excitation current I1 and second excitation current I2 are maintained at the polarity and current amount (level) specified by the control signals DVS.

The motor 4 is composed of the motor coil 5 of the first excitation phase, the motor coil 6 of the second excitation phase, and a rotor 7. The first excitation current I1 flows to the motor coil 5 of the first excitation phase, and the second excitation current I2 flows to the motor coil 6 of the second excitation phase, as described above.

In a configuration in which the signal generator 2 generates control signals DVS of the parallel input method from control signals INS of the clock input method and outputs the control signals DVS to the drive unit 3 as described above, the number of signal lines used to input the control signals to the motor drive device 1 can be reduced relative to a configuration in which control signals DVS of the parallel input method are directly inputted to the drive unit 3 from outside the device.

For example, in printers, facsimile machines, and copy machines, numerous stepping motors are used in paper feed rollers and other applications, and numerous motor drive devices are needed. Numerous motor drive devices must therefore be controlled at once by the microcomputer or other computation device that performs the main control of a copy machine, but in a case in which control signals DVS of the parallel input method are required for the motor drive devices, the number of signal lines for transmitting signals from the microcomputer to the motor drive devices dramatically increases, and extremely high processing loads are also placed on the microcomputer. In the motor drive device 1 of the present embodiment, however, since control signals INS of the clock input method can be received from the microcomputer, the number of signal lines can be reduced, and the processing load on the microcomputer can be reduced as well.

Figure 2:
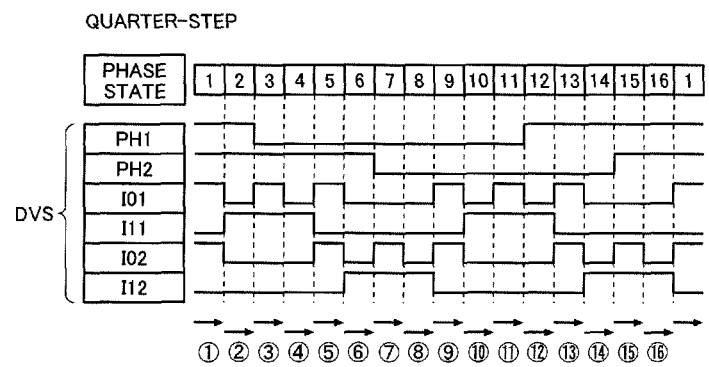
FIG. 2 is a timing chart showing the change over time in the control signals DVS in the quarter-step drive method.

FIG. 2 is a timing chart showing the change over time in the control signals DVS in the quarter-step drive method. As previously described, the polarity and current amount (level) of the first excitation current I1 are determined by the combination of the first polarity signal PH1 and the first current amount signal I01/I11, and the polarity and current amount (level) of the second excitation current I2 are determined by the combination of the second polarity signal PH2 and the second current amount signals I02/I12. In a case in which the quarter-step drive method is selected, the motor 4 is step-driven by a step angle θs (=an electrical angle of 22.5°=an electrical angle of 360°/16 steps).

Figure 3:
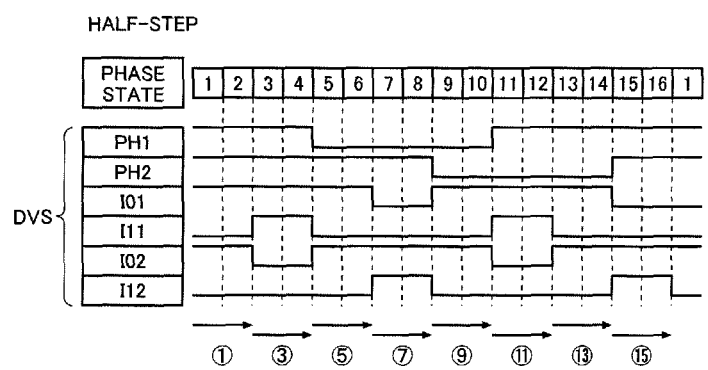
FIG. 3 is a timing chart showing the change over time in the control signals DVS in the half-step drive method.

FIG. 3 is a timing chart showing the change over time in the control signals DVS in the half-step drive method. During half-step driving, combinations are formed for each two consecutive phase states, and the polarity and current amount of the excitation current of each phase are the same in each combination. Consequently, each time a changeover occurs from one combination to the next combination, at least one of the polarity and the current amount of the excitation current is switched in at least one excitation phase. In a case in which the half-step drive method is selected, the motor 4 is step-driven by a step angle 2θs (=el angle of 45°=electrical angle of 360°/8 steps).

Figure 4:
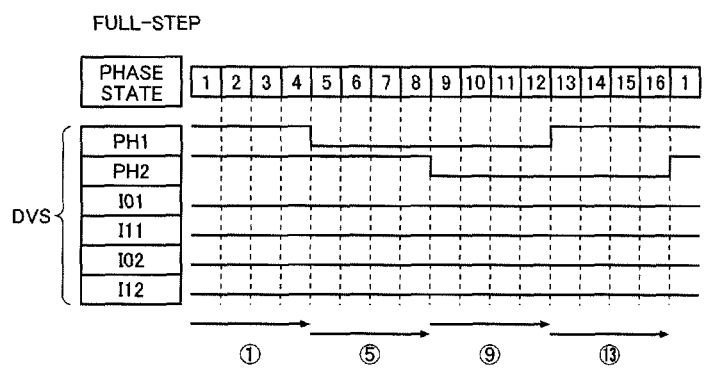
FIG. 4 is a timing chart showing the change over time in the control signals DVS in the full-step drive method.

FIG. 4 is a timing chart showing the change over time in the control signals DVS in the full-step drive method. During full-step driving, combinations are formed for each four consecutive phase states, and the polarity and current amount of the excitation current of each phase are the same in each combination. Consequently, each time a changeover occurs from one combination to the next combination, at least one of the polarity and the current amount of the excitation current is switched in at least one excitation phase. In a case in which the full-step drive method is selected, the motor 4 is step-driven by a step angle 4θs (=electrical angle of 90°=electrical angle of 360°/4 steps).

The reset signal PS is not shown in FIGS. 2 through 4, but the electrical potential level of the reset signal PS is fixed at a high level or a low level so as to maintain the operating state of the drive unit 3.

Figure 5:
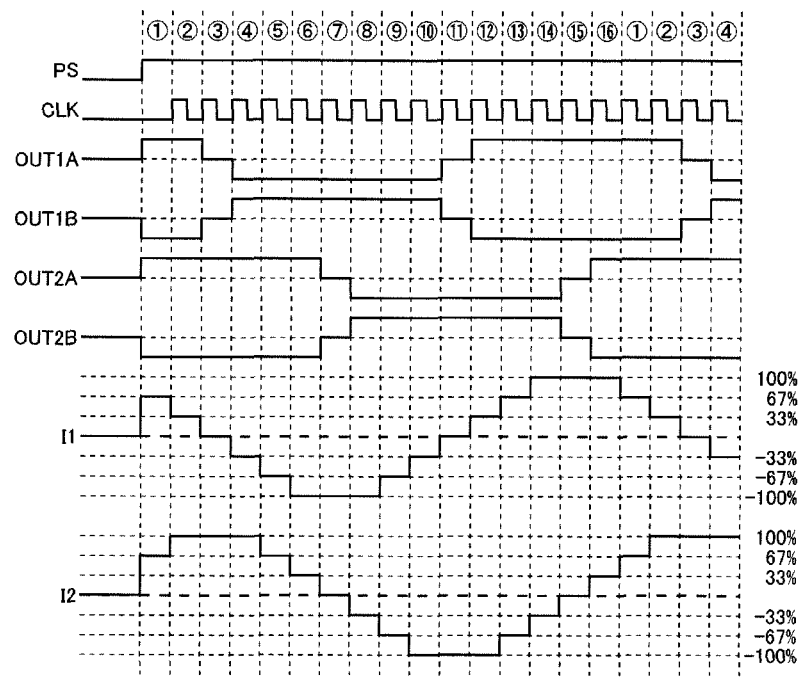
FIG. 5 is a timing chart showing the change over time in the first excitation current I1 and second excitation current I2 in the quarter-step drive method.

FIG. 5 is a timing chart showing the change over time of the first excitation current I1 and the second excitation current I2 in the quarter-step drive method, and shows, in order from the top, the reset signal PS, the clock signal CLK, an output voltage OUT1A, an output voltage OUT1B, an output voltage OUT2A, an output voltage OUT2B, the first excitation current I1, and the second excitation current I2.

The output voltage OUT1A, the output voltage OUT1B, the output voltage OUT2A, and the output voltage OUT2B indicate the potential levels of the external terminal T21, the external terminal T22, the external terminal T23, and the external terminal T24, respectively.

Although not shown in FIG. 5, the excitation method switching signals MODE0/MODE1 are both set to a high level in order to select the quarter-step drive method as the excitation method of the motor 4. The rotation direction switching signal CWCCW is also set to a low level in order to step-drive the rotor 7 of the motor 4 in the positive rotation direction.

The circled numbers (1) through (16) shown in FIG. 5 respectively correspond to the phase states "1" through "16" shown in FIG. 2.

It is apparent by referencing FIG. 2 and FIG. 5 that the low level and high level of the first polarity signal PH1 correspond to the positive polarity and negative polarity of the first excitation current I1. It is also apparent that the combinations of logical levels of the first current amount signal I01/I11, i.e., (I01, I11)=(H, H), (L, H), (H, L), (L, L), respectively correspond to four levels of current amounts (0%, 33%, 67%, and 100% with respect to the maximum current amount). The low level and high level of the second polarity signal PH2 correspond in the same manner to the positive polarity and negative polarity of the second excitation current I2, and the combinations of logical levels of the second current amount signals I02/I12 respectively correspond to four levels of current amounts.

Figure 6:
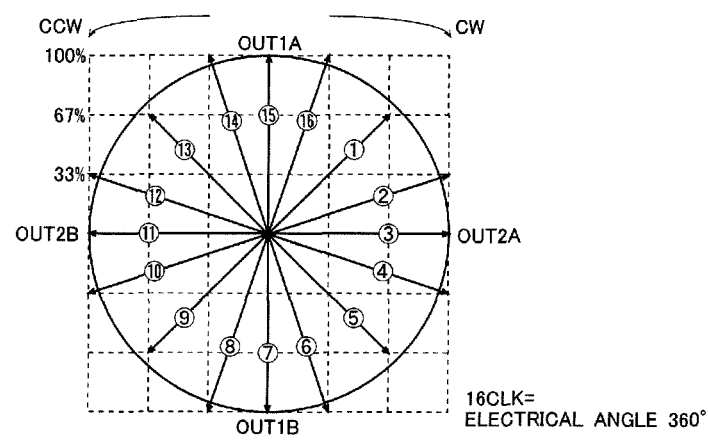
FIG. 6 is a torque vector diagram of the motor 4 for the quarter-step drive method.

FIG. 6 is a torque vector diagram of the motor 4 for the quarter-step drive method, and schematically shows the step angle θs (minimum step angle) of the motor 4 and the size and direction of the first excitation current I1 and second excitation current I2. For example, when the first excitation current I1 is flowing toward an external terminal T12 from an external terminal T11, the arrow indicating the torque vector is oriented in the direction of OUT1A. The size (length of the arrow) of the torque vector indicates the ratio of the actual current amount with respect to the maximum current amount of the first excitation current I1 (second excitation current I2). The position of the torque vector corresponds to the rotation position of the rotor 7. In the present embodiment, the step angle θs in the quarter-step drive method is 22.5° in terms of electrical angle (=electrical angle of 360°/16 steps), and by inputting sixteen pulses of the clock signal CLK, the rotor 7 is step-driven one cycle (=electrical angle of)360°.

Figure 7:
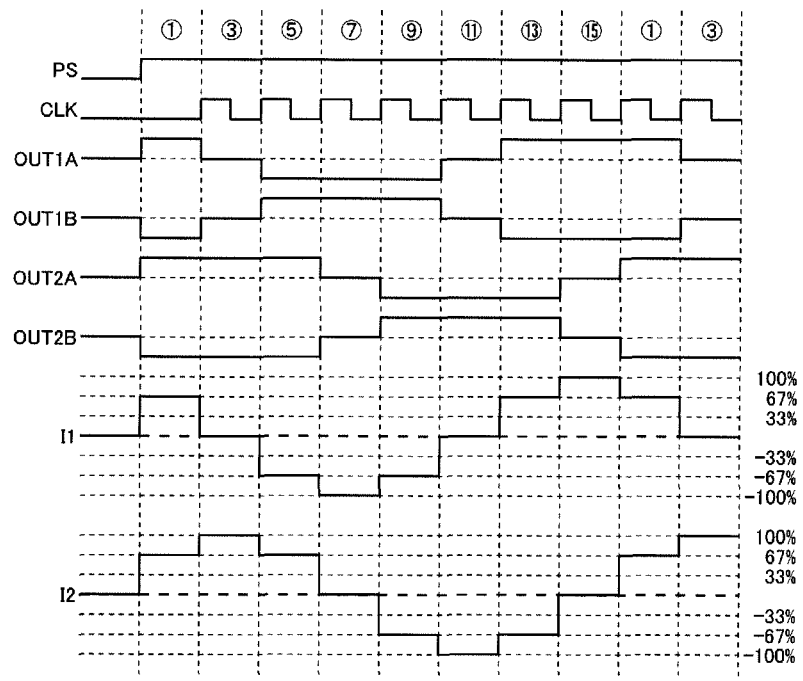
FIG. 7 is a timing chart showing the change over time in the first excitation current I1 and second excitation current I2 in the half-step drive method.

FIG. 7 is a timing chart showing the change over time in the first excitation current I1 and second excitation current I2 in the half-step drive method, and shows, in order from the top, the reset signal PS, the clock signal CLK, the output voltage OUT1A, the output voltage OUT1B, the output voltage OUT2A, the output voltage OUT2B, the first excitation current I1, and the second excitation current I2.

The circled numbers (1), (3), (5), (7), (9), (11), (13), and (15) shown in FIG. 7 respectively correspond to the combinations shown in FIG. 3 that are each formed by two phase states. More specifically, circled number (1) in FIG. 7 corresponds to the combination formed by the two phase states "1" and "2" shown in FIG. 3, and circled number (3) in FIG. 7 corresponds to the combination formed by the two phase states "3" and "4" shown in FIG. 3. This correspondence continues for the subsequent numbers.

It is apparent by referencing FIG. 3 and FIG. 7 that the low level and high level of the first polarity signal PH1 correspond to the positive polarity and negative polarity of the first excitation current I1. It is also apparent that the combinations of logical levels of the first current amount signal I01/I11, i.e., (I01, I11)=(H, H), (H, L), (L, L), respectively correspond to three levels of current amounts (0%, 67%, and 100% with respect to the maximum current amount). The low level and high level of the second polarity signal PH2 correspond in the same manner to the positive polarity and negative polarity of the second excitation current I2, and the combinations of logical levels of the second current amount signals I02/I12 respectively correspond to three levels of current amounts.

Figure 8:
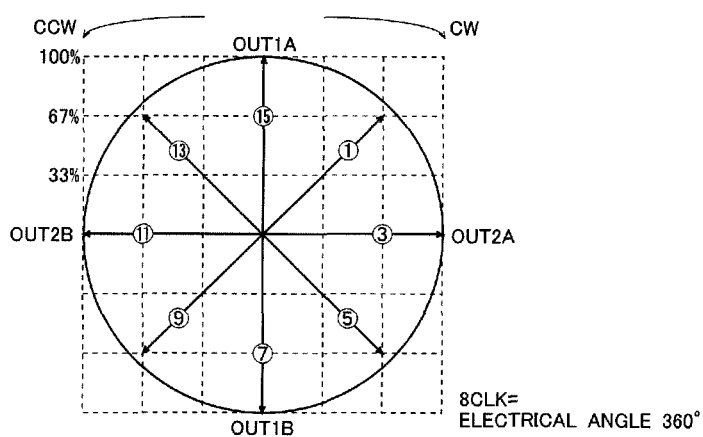
FIG. 8 is a torque vector diagram of the motor 4 for the half-step drive method.

FIG. 8 is a torque vector diagram of the motor 4 for the half-step drive method. As previously described, in a case in which the half-step drive method is selected, the motor 4 is step-driven by a step angle 2θs (=electrical angle of 45°=electrical angle of 360°/8 steps). The rotor 7 is therefore step-driven one cycle (=electrical angle of)360° by inputting eight pulses of the clock signal CLK.

Figure 9:
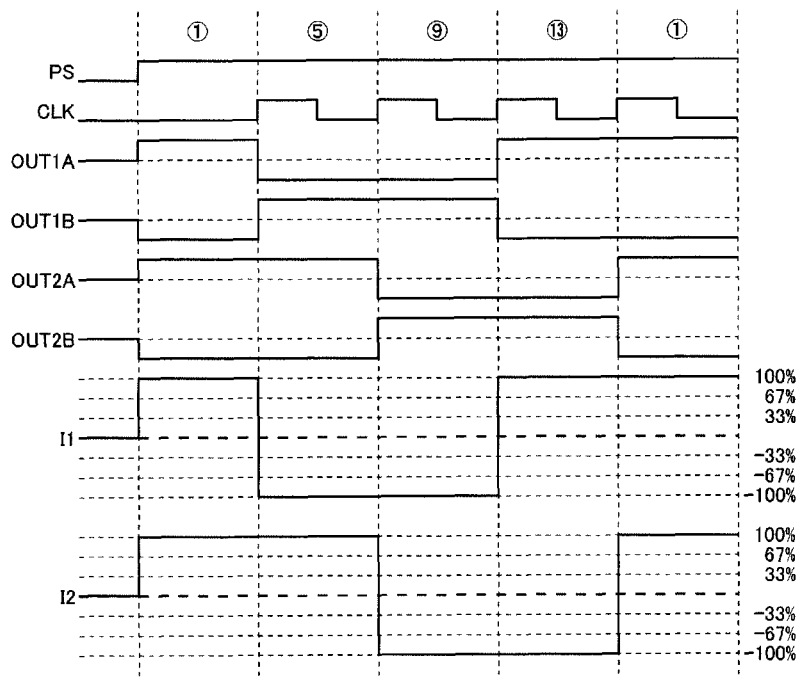
FIG. 9 is a timing chart showing the change over time in the first excitation current I1 and second excitation current I2 in the full-step drive method.

FIG. 9 is a timing chart showing the change over time in the first excitation current I1 and second excitation current I2 in the full-step drive method, and shows, in order from the top, the reset signal PS, the clock signal CLK, the output voltage OUT1A, the output voltage OUT1B, the output voltage OUT2A, the output voltage OUT2B, the first excitation current I1, and the second excitation current I2.

The circled numbers (1), (5), (9), and (13) shown in FIG. 9 respectively correspond to the combinations shown in FIG. 4 that are each formed by four phase states. More specifically, circled number (1) in FIG. 9 corresponds to the combination formed by the four phase states "1" through "4" shown in FIG. 4, and circled number (5) in FIG. 9 corresponds to the combination formed by the four phase states "5" through "8" shown in FIG. 4. This correspondence continues for the subsequent numbers.

It is apparent by referencing FIG. 4 and FIG. 9 that the low level and high level of the first polarity signal PH1 correspond to the positive polarity and negative polarity of the first excitation current I1. It is also apparent that the first current amount signals I01/I11 are always fixed at the low level, and that the current amount of the first excitation current I1 is fixed at the predetermined maximum current amount (100%). The low level and high level of the second polarity signal PH2 correspond in the same manner to the positive polarity and negative polarity of the second excitation current I2, and the second current amount signals I02/I12 are always set to the low level.

Figure 10:
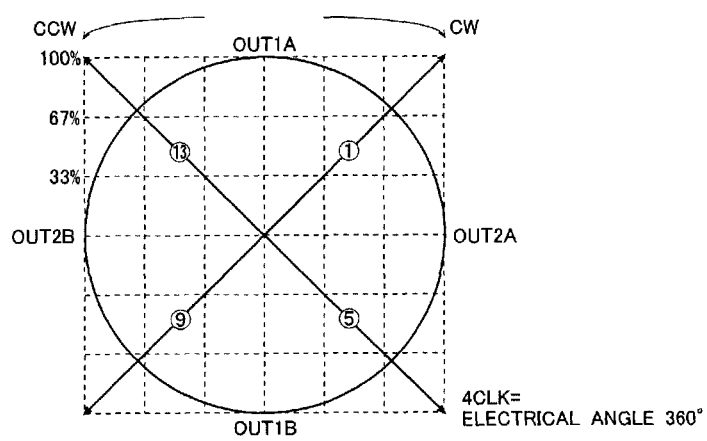
FIG. 10 is a torque vector diagram of the motor 4 for the full-step drive method.

FIG. 10 is a torque vector diagram of the motor 4 for the full-step drive method. As previously described, in a case in which the full-step drive method is selected, the motor 4 is step-driven by a step angle 4θs (=electrical angle of 90°=electrical angle of 360°/4 steps). The rotor 7 is therefore step-driven one cycle (=electrical angle of 360°) by inputting four pulses of the clock signal CLK.

A configuration is adopted herein in which the signal generator 2 mounted in the motor drive device 1 of the present embodiment generates control signals DVS of the parallel input method from the control signals INS of the clock input method and controls the torque vector of the motor 4 so that the correlation between the number of pulses (internal count value of the signal generator 2) of the clock signal CLK and the phase (excitation point) of the torque vector of the motor 4 is held in common for all the excitation methods, with the excitation method having the greatest number of steps (number of torque vectors), i.e., the excitation method having the smallest microsteps (which is the quarter-step drive method in the present embodiment), being used as a reference, that the torque vector of the motor 4 as a rule is maintained in the same phase (same excitation point) as before switching when the excitation method is switched, and that the torque vector is in the closest phase in the rotation direction of the motor 4 in a case in which there is no phase that is the same as the phase prior to switching.

FIG. 11A is a table showing the change in the excitation point during switching of the excitation method (positive rotation/negative rotation, full→half). The four excitation points (see FIG. 10) in the full-step drive method prior to switching are all included in the eight excitation points (see FIG. 8) in the half-step drive method after switching. Consequently, when the excitation method is switched from the full-step drive method to the half-step drive method, the torque vector of the motor 4 is controlled so as to be maintained at the same excitation point before and after switching of the excitation method, regardless of whether the motor 4 is rotating positively or negatively, and for all excitation points of the torque vector of the motor 4.

FIG. 11B is a table showing the change in the excitation point during switching of the excitation method (positive rotation, half→full), and FIG. 11C is a table showing the change in the excitation point during switching of the excitation method (negative rotation, half→full).

Among the eight excitation points (see FIG. 8) in the half-step drive method prior to switching, circled numbers (1), (5), (9), and (13) are the same as the four excitation points (see FIG. 10) in the full-step drive method after switching. Consequently, when the excitation method is switched from the half-step drive method to the full-step drive method in a state in which the torque vector of the motor 4 is at any of the abovementioned excitation points, the torque vector of the motor 4 is controlled so as to be maintained at the same excitation point before and after switching of the excitation method, regardless of whether the motor 4 is rotating positively or negatively.

However, the same excitation points do not exist in the full-step drive method after switching for the points other than the four points described above, i.e., circled numbers (3), (7), (11), and (15) among the eight excitation points in the half-step drive method prior to switching. Consequently, when the excitation method is switched from the half-step drive method to the full-step drive method in a state in which the torque vector of the motor 4 is not at any of the abovementioned excitation points, the torque vector of the motor 4 is controlled so as to transition to the closest excitation point in the rotation direction of the motor 4.

For example, in a case in which the excitation method is switched from the half-step drive method to the full-step drive method in a state in which the torque vector of the motor 4 is at the excitation point indicated by circled number (3) in FIG. 8, when the motor 4 is rotating positively, the torque vector of the motor 4 is transitioned to the excitation point indicated by circled number (5) in FIG. 10 (see FIG. 11B), and when the motor 4 is rotating negatively, the torque vector of the motor 4 is transitioned to the excitation point indicated by circled number (1) in FIG. 10 (see FIG. 11C).

FIG. 12A is a table showing the change in the excitation point during switching of the excitation method (positive rotation/negative rotation, full→quarter). The four excitation points (see FIG. 10) in the full-step drive method prior to switching are all included in the sixteen excitation points (see FIG. 6) in the quarter-step drive method after switching. Consequently, when the excitation method is switched from the full-step drive method to the quarter-step drive method, the torque vector of the motor 4 is controlled so as to be maintained at the same excitation point before and after switching of the excitation method, regardless of whether the motor 4 is rotating positively or negatively, and for all excitation points of the torque vector of the motor 4.

FIG. 12B is a table showing the change in the excitation point during switching of the excitation method (positive rotation, quarter→full), and FIG. 12C is a table showing the change in the excitation point during switching of the excitation method (negative rotation, quarter→full).

Among the sixteen excitation points (see FIG. 6) in the quarter-step drive method prior to switching, circled numbers (1), (5), (9), and (13) are the same as the four excitation points (see FIG. 10) in the full-step drive method after switching. Consequently, when the excitation method is switched from the quarter-step drive method to the full-step drive method in a state in which the torque vector of the motor 4 is at any of the abovementioned excitation points, the torque vector of the motor 4 is controlled so as to be maintained at the same excitation point before and after switching of the excitation method, regardless of whether the motor 4 is rotating positively or negatively.

However, the same excitation points do not exist in the full-step drive method after switching for the twelve points other than the points described above, i.e., circled numbers (2) through (4), (6) through (8), (10) through (12), and (14) through (16) among the sixteen excitation points in the quarter-step drive method prior to switching. Consequently, when the excitation method is switched from the quarter-step drive method to the full-step drive method in a state in which the torque vector of the motor 4 is at any of the above-mentioned excitation points, the torque vector of the motor 4 is controlled so as to transition to the closest excitation point in the rotation direction of the motor 4.

For example, in a case in which the excitation method is switched from the quarter-step drive method to the full-step drive method in a state in which the torque vector of the motor 4 is at the excitation point indicated by circled number (3) in FIG. 6, when the motor 4 is rotating positively, the torque vector of the motor 4 is transitioned to the excitation point indicated by circled number (5) in FIG. 10 (see FIG. 12B), and when the motor 4 is rotating negatively, the torque vector of the motor 4 is transitioned to the excitation point indicated by circled number (1) in FIG. 10 (see FIG. 12C).

FIG. 13A is a table showing the change in the excitation point during switching of the excitation method (positive rotation/negative rotation, half→quarter). The eight excitation points (see FIG. 8) in the half-step drive method prior to switching are all included in the sixteen excitation points (see FIG. 6) in the quarter-step drive method after switching. Consequently, when the excitation method is switched from the half-step drive method to the quarter-step drive method, the torque vector of the motor 4 is controlled so as to be maintained at the same excitation point before and after switching of the excitation method, regardless of whether the motor 4 is rotating positively or negatively, and for all excitation points of the torque vector of the motor 4.

FIG. 13B is a table showing the change in the excitation point during switching of the excitation method (positive rotation, quarter half), and FIG. 13C is a table showing the change in the excitation point during switching of the excitation method (negative rotation, quarter→half).

Among the sixteen excitation points (see FIG. 6) in the quarter-step drive method prior to switching, circled numbers (1), (3), (5), (7), (9), (11), (13), and (15) are the same as the eight excitation points (see FIG. 8) in the half-step drive method after switching. Consequently, when the excitation method is switched from the quarter-step drive method to the half-step drive method in a state in which the torque vector of the motor 4 is at any of the abovementioned excitation points, the torque vector of the motor 4 is controlled so as to be maintained at the same excitation point before and after switching of the excitation method, regardless of whether the motor 4 is rotating positively or negatively.

However, the same excitation points do not exist in the half-step drive method after switching for the eight points other than the points described above, i.e., circled numbers (2), (4), (6), (8), (10), (12), (14), and (16) among the sixteen excitation points in the quarter-step drive method prior to switching. Consequently, when the excitation method is switched from the quarter-step drive method to the half-step drive method in a state in which the torque vector of the motor 4 is not at any of the abovementioned excitation points, the torque vector of the motor 4 is controlled so as to transition to the closest excitation point in the rotation direction of the motor 4.

For example, in a case in which the excitation method is switched from the quarter-step drive method to the half-step drive method in a state in which the torque vector of the motor 4 is at the excitation point indicated by circled number (2) in FIG. 6, when the motor 4 is rotating positively, the torque vector of the motor 4 is transitioned to the excitation point indicated by circled number (3) in FIG. 8 (see FIG. 13B), and when the motor 4 is rotating negatively, the torque vector of the motor 4 is transitioned to the excitation point indicated by circled number (1) in FIG. 8 (see FIG. 13C).

By adopting such a configuration, constraints on the timing of switching the excitation method can be alleviated (the degree of freedom of the control sequence can be enhanced), the time taken for motor vibration to converge (settling time) can be reduced, vibration noise can be reduced, and other effects can be obtained in the set that uses the motor 4, and these effects can contribute to increased speed of the set.

The internal structure and operation of the signal generator 2 for controlling the torque vector during switching of the excitation method as described above will next be described in detail with reference to the drawings.

Figure 14:
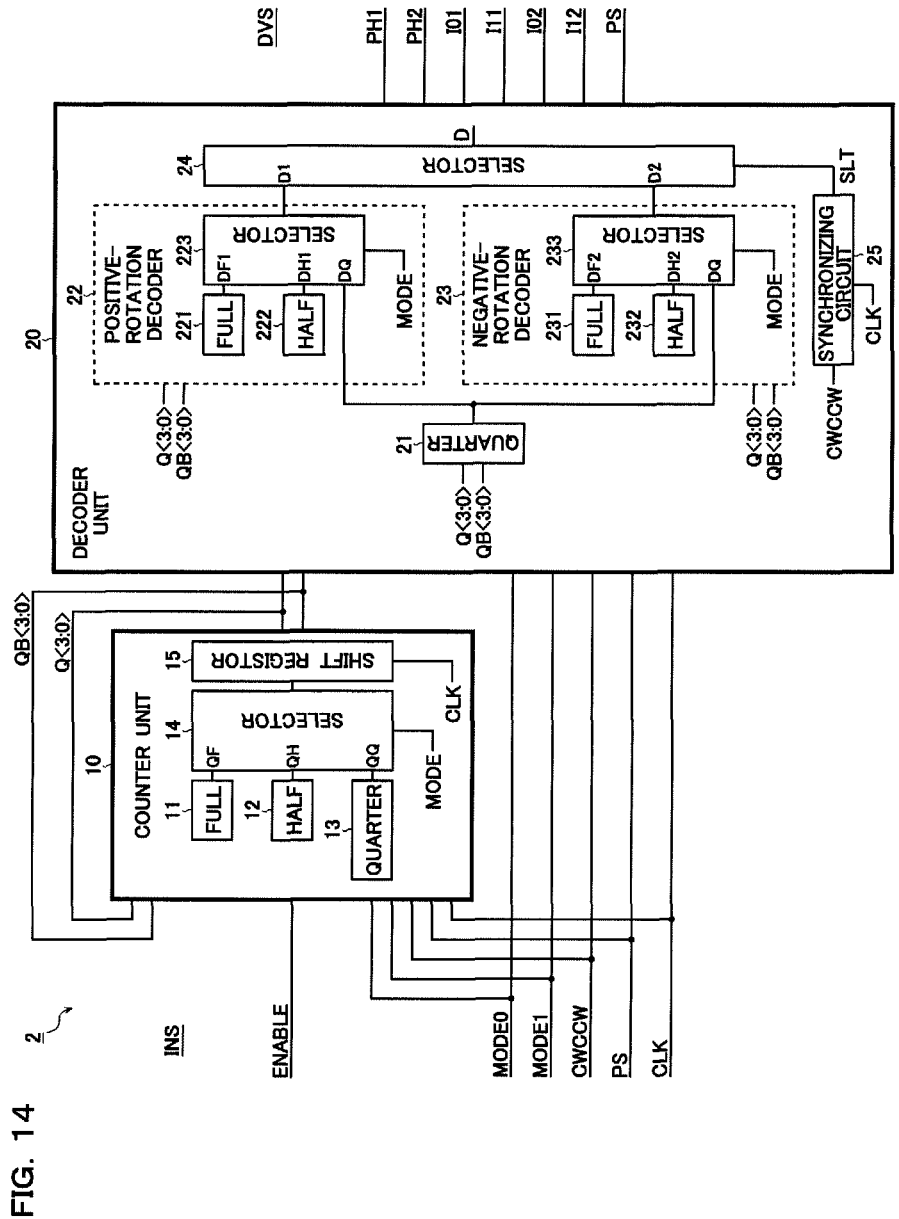
FIG. 14 is a block diagram showing an example of the structure of the signal generator 2.

FIG. 14 is a block diagram showing an example of the structure of the signal generator 2. As shown in FIG. 14, the signal generator 2 in the present example is composed of a counter unit 10 and a decoder unit 20.

The counter unit 10 is a means for counting the number of pulses of the clock signal CLK and outputting the count value as a 4-bit output signal Q (and inverted output signal QB; the same hereinafter) to the decoder unit 20, and is composed of internal count decoders 11 through 13, an internal count selector 14, and a shift register 15. Clock-input-method control signals INS inputted to the counter unit 10 include the clock signal CLK as well as the enable signal ENABLE, the excitation method switching signals MODE0/MODE1, the rotation direction switching signal CWCCW, and the reset signal PS.

The decoders 11 through 13 generate an internal count signal QF for full-step driving, an internal count signal QH for half-step driving, and an internal count signal QQ for quarter-step driving (each of these signals being 4-bit signals), respectively, in parallel fashion in accordance with the output signal Q inputted as feedback from the shift register 15, and in accordance with the rotation direction switching signal CWCCW inputted from the outside.

The selector 14 selects any one of the internal count signals QF, QH, and QQ in accordance with the excitation method switching signal MODE and stores the selected signal in the shift register 15. More specifically, the internal count signal QF of the decoder 11 is stored in the shift register 15 in a case in which the full-step drive method is selected, the internal count signal QH of the decoder 12 is stored in the shift register 15 in a case in which the half-step drive method is selected, and the internal count signal QQ of the decoder 13 is stored in the shift register 15 in a case in which the quarter-step drive method is selected.

The shift register 15 outputs the stored value thereof as the output signal Q with each rise (or fall) of the clock signal CLK.

The decoder unit 20 is a means for generating parallel-input-method control signals DVS (first polarity signal PH1, second polarity signal PH2, first current amount signals I01/I11, and second current amount signals I02/I12) on the basis of the output signal Q inputted from the counter unit 10, the excitation method switching signals MODE0/MODE1 inputted from the outside, the rotation direction switching signal CWCCW, the reset signal PS, and the clock signal CLK, and is composed of a positive-rotation/negative-rotation decoder 21, a positive-rotation decoder 22, a negative-rotation decoder 23, a rotation direction switching selector 24, and a synchronizing circuit 25.

The positive-rotation/negative-rotation decoder 21 generates a control signal DQ of the parallel input method in accordance with the output signal Q of the counter unit 10. The control signal DQ is a control signal for specifying the excitation point during quarter-step driving (regardless of whether the rotation is positive or negative), and is outputted to both the positive-rotation decoder 22 and the negative-rotation decoder 23 (more specifically, to both of selectors 223 and 233 of the positive-rotation decoder 22 and negative-rotation decoder 23, respectively).

The positive-rotation decoder 22 includes excitation point specification decoders 221 and 222, and an excitation point specification selector 223. The decoders 221 and 222 generate control signals DF1 and DH1, respectively, of the parallel input method in accordance with the output signal Q of the counter unit 10. The control signal DF1 is a control signal for specifying the excitation point during full-step driving (during positive rotation), and the control signal DH1 is a control signal for specifying the excitation point during half-step driving (during positive rotation). The selector 223 selects any one of the control signals DF1, DH1, and DQ on the basis of the excitation method switching signal MODE, and outputs the selected control signal as a control signal D1 to the selector 24.

The negative-rotation decoder 23 includes excitation point specification decoders 231 and 232, and an excitation point specification selector 233. The decoders 231 and 232 generate control signals DF2 and DH2, respectively, of the parallel input method in accordance with the output signal Q of the counter unit 10. The control signal DF2 is a control signal for specifying the excitation point during full-step driving (during negative rotation), and the control signal DH2 is a control signal for specifying the excitation point during half-step driving (during negative rotation). The selector 233 selects any one of the control signals DF2, DH2, and DQ on the basis of the excitation method switching signal MODE, and outputs the selected control signal as a control signal D2 to the selector 24.

The decode operations of the positive-rotation/negative-rotation decoder 21, the decoders 221 and 222 included in the positive-rotation decoder 22, and the decoders 231 and 232 included in the negative-rotation decoder 23 (the operations for generating the control signals DQ, DH1, DF1, DH2, and DF2 based on the output signal Q) are performed in parallel with each other.

The selector 24 selects any one of the control signal D1 inputted from the positive-rotation decoder 22 and the control signal D2 inputted from the negative-rotation decoder 23, on the basis of a switching signal SLT inputted from the synchronizing circuit 25, and outputs the selected control signal as a final control signal DVS to the drive unit of a subsequent stage (not shown in FIG. 14).

The synchronizing circuit 25 generates the abovementioned switching signal SLT on the basis of the rotation direction switching signal CWCCW and the clock signal CLK and outputs the switching signal SLT to the selector 24. More specifically, the synchronizing circuit 25 latches the logical level of the rotation direction switching signal CWCCW with each rise (or fall) of the clock signal CLK, and outputs the latch signal as the switching signal SLT. Specifically, the switching signal SLT can be considered to be a signal in which the rotation direction switching signal CWCCW is synchronized with the clock signal CLK.

When the first pulse has risen (or fallen) in the clock signal CLK, the transition destination of the excitation point varies according to which excitation method is selected. Therefore, the decoder unit 20 in the present example has a separate decoder 21 for quarter-step driving, separate decoders 222 and 232 for half-step driving, and separate decoders 221 and 231 for full-step driving.

As for the rotation direction of the motor 4 during switching of the excitation method, the transition destination of the excitation point during positive rotation of the motor (CWCCW=L) is the same as the transition destination of the excitation point during negative rotation of the motor (CWCCW=H) during switching to the quarter-step drive method (see FIG. 12A or FIG. 13A). Therefore, the decoder unit 20 in the present example has only the positive-rotation/negative-rotation decoder 21 as a means for specifying the excitation point during quarter-step driving.

During switching to the full-step drive method or the half-step drive method, the transition destination of the excitation point during positive rotation of the motor is not necessarily the same as the transition destination of the excitation point during negative rotation of the motor (compare FIGS. 11B and 11C, FIGS. 12B and 12C, and FIGS. 13B and 13C). Therefore, the decoder unit 20 in the present example has a separate positive-rotation decoder 22 and negative-rotation decoder 23 as means for specifying the excitation point during full-step driving and the excitation point during half-step driving, respectively.

FIG. 15A is a table showing the correlation between the output signal Q (Q0 through Q3) and internal count signal QQ (QQ0 through QQ3) during positive rotation of the motor. The output signal Q, which is the output value of the shift register 15, specifies the current state of the motor 4, and the excitation point noted to the right thereof indicates the excitation point that is specified by the decoder 21 (control signal DQ) in accordance with the output signal Q. On the other hand, the internal count signal QQ, which is the output value of the decoder 13, specifies the next state of the motor 4, and the excitation point noted to the right thereof indicates the expected excitation point (next excitation point in the quarter-step drive method) that is specified by the decoder 21 (control signal DQ) in accordance with the output signal Q in a case in which the current internal count signal QQ is outputted as the output signal Q at the next clock timing.

For example, in a case in which the output signal Q is "0d (0000b)" (where the symbol d indicates decimal notation, and the symbol b indicates binary notation; the same hereinafter), the torque vector of the motor 4 is specified by the excitation point indicated by circled number (1) in FIG. 6. The decoder 13 that receives the output signal Q outputs the value obtained by once incrementing the current value of the output signal Q, i.e., "1d (0001b)," as the internal count signal QQ so that the excitation point indicated by circled number (2) in FIG. 6 is specified as the next excitation point. At this time, when the quarter-step drive method is selected by the excitation method switching signal MODE, the above-mentioned internal count signal QQ is stored in the shift register 15 via the selector 14. When the clock signal CLK subsequently rises (or falls), the shift register 15 outputs the stored value "1 d (0001b)" thereof as the output signal Q. Inputting of this output signal Q to the decoder unit 20 causes the torque vector of the motor 4 to transition to the excitation point indicated by circled number (2) in FIG. 6.

Thereafter as well, the decoder 13 generates the internal count signal QQ obtained by once incrementing the current value of the output signal Q each time the clock signal CLK rises (or falls) when the rotation direction switching signal CWCCW is at the logical level (low level in the present embodiment) that specifies positive rotation of the motor 4. However, in a case in which the current value of the output signal Q is "15d (1111b)," since the value cannot be incremented further, the next rise (or fall) of the clock signal CLK triggers a return of the internal count signal QQ to "0d (0000b)."

As the decode operation described above continues, the torque vector of the motor 4 transitions in sequence clockwise through the excitation points indicated by circled numbers (1) through (16) in FIG. 6. The shaded cells in the table indicate output signals Q that can potentially be outputted from the shift register 15 during quarter-step driving.

FIG. 15B is a table showing the correlation between the output signal Q (Q0 through Q3) and the internal count signal QQ (QQ0 through QQ3) during negative rotation of the motor. The items shown in the table are the same as in FIG. 15A.

For example, in a case in which the output signal Q is "15d (1111b)," the torque vector of the motor 4 is specified by the excitation point indicated by circled number (16) in FIG. 6. The decoder 13 that receives the output signal Q outputs the value obtained by once decrementing the current value of the output signal Q, i.e., "14d (1110b)," as the internal count signal QQ so that the excitation point indicated by circled number (15) in FIG. 6 is specified as the next excitation point. At this time, when the quarter-step drive method is selected by the excitation method switching signal MODE, the abovementioned internal count signal QQ is stored in the shift register 15 via the selector 14. When the clock signal CLK subsequently rises (or falls), the shift register 15 outputs the stored value "14d (1110b)" thereof as the output signal Q. Inputting of this output signal Q to the decoder unit 20 causes the torque vector of the motor 4 to transition to the excitation point indicated by circled number (15) in FIG. 6.

Thereafter as well, the decoder 13 generates the internal count signal QQ obtained by once decrementing the current value of the output signal Q each time the clock signal CLK rises (or falls) when the rotation direction switching signal CWCCW is at the logical level (high level in the present embodiment) that specifies negative rotation of the motor 4. However, in a case in which the current value of the output signal Q is "0d (0000b)," since the value cannot be decremented further, the next rise (or fall) of the clock signal CLK triggers a return of the internal count signal QQ to "15d (1111b)."

As the decode operation described above continues, the torque vector of the motor 4 transitions in sequence counterclockwise through the excitation points indicated by circled numbers (1) through (16) in FIG. 6. The shaded cells in the table indicate output signals Q that can potentially be outputted from the shift register 15 during quarter-step driving.

FIG. 16A is a table showing the correlation between the output signal Q (Q0 through Q3) and internal count signal QH (QH0 through QH3) during positive rotation of the motor. The output signal Q, which is the output value of the shift register 15, specifies the current state of the motor 4, and the excitation point noted to the right thereof indicates the excitation point that is specified by the decoder 22 (control signal DH1) in accordance with the output signal Q. On the other hand, the internal count signal QH, which is the output value of the decoder 12, specifies the next state of the motor 4, and the excitation point noted to the right thereof indicates the expected excitation point (next excitation point in the half-step drive method) that is specified by the decoder 222 (control signal DH1) in accordance with the output signal Q in a case in which the current internal count signal QH is outputted as the output signal Q at the next clock timing.

For example, in a case in which the output signal Q is "0d (0000b)," the torque vector of the motor 4 is specified by the excitation point indicated by circled number (1) in FIG. 8. The decoder 12 that receives the output signal Q outputs the value obtained by twice incrementing the current value of the output signal Q, i.e., "2d (0010b)," as the internal count signal QH so that the excitation point indicated by circled number (3) in FIG. 8 is specified as the next excitation point. At this time, when the half-step drive method is selected by the excitation method switching signal MODE, the abovementioned internal count signal QH is stored in the shift register 15 via the selector 14. When the clock signal CLK subsequently rises (or falls), the shift register 15 outputs the stored value "2d (0010b)" thereof as the output signal Q. Inputting of this output signal Q to the decoder unit 20 causes the torque vector of the motor 4 to transition to the excitation point indicated by circled number (3) in FIG. 8.

Thereafter as well, the decoder 12 generates the internal count signal QH obtained by twice incrementing the current value of the output signal Q each time the clock signal CLK rises (or falls) when the rotation direction switching signal CWCCW is at the logical level (low level in the present embodiment) that specifies positive rotation of the motor 4. However, in a case in which the current value of the output signal Q is "14d (1110b)," since the value cannot be incremented further, the next rise (or fall) of the clock signal CLK triggers a return of the internal count signal QH to "0d (0000b)."

As the decode operation described above continues, the torque vector of the motor 4 transitions in sequence clockwise through the excitation points indicated by circled numbers (1), (3), (5), (7), (9), (11), (13), and (15) in FIG. 8. The shaded cells in the table indicate output signals Q that can potentially be outputted from the shift register 15 during half-step driving. The non-shaded cells indicate output signals Q that have no possibility of being outputted during half-step driving (i.e., output signals Q that can be outputted only during quarter-step driving).

For example, in a case in which the output signal Q immediately prior to switching the excitation method from the quarter-step drive method to the half-step drive method is "1d (0001b)," and the excitation point indicated by circled number (2) in FIG. 6 is specified, since the excitation point specified in the quarter-step drive method prior to switching is not present in the half-step drive method after switching, the torque vector of the motor 4 must be controlled so as to transition to the closest excitation point in the rotation direction of the motor 4 (i.e., the excitation point indicated by circled number (3) in FIG. 8).

Therefore, the decoder 222 that receives the abovementioned output signal Q outputs the control signal DH1 for specifying the excitation point indicated by circled number (3) in FIG. 8 as the excitation point to be specified at the timing of the switch from the quarter-step drive method to the half-step drive method, and after the excitation method has been switched from the quarter-step drive method to the half-step drive method, the decoder 12 that receives the output signal Q outputs the internal count signal QH ("4d (0100b)") for specifying the excitation point indicated by circled number (5) in FIG. 8 as the excitation point to be specified at the next clock timing.

Such an operation makes it possible to control the torque vector of the motor 4 so that the torque vector is in the closest phase in the rotation direction of the motor 4 in a case in which there is no phase that is the same as that prior to switching when the excitation method is switched from the quarter-step drive method to the half-step drive method. For the non-shaded cells, the same operation as described above is performed as well in cases in which other output signals Q are outputted.

FIG. 16B is a table showing the correlation between the output signal Q (Q0 through Q3) and internal count signal QH (QH0 through QH3) during negative rotation of the motor. The output signal Q, which is the output value of the shift register 15, specifies the current state of the motor 4, and the excitation point noted to the right thereof indicates the excitation point that is specified by the decoder 232 (control signal DH2) in accordance with the output signal Q. On the other hand, the internal count signal QH, which is the output value of the decoder 12, specifies the next state of the motor 4, and the excitation point noted to the right thereof indicates the expected excitation point (next excitation point in the half-step drive method) that is specified by the decoder 232 (control signal DH2) in accordance with the output signal Q in a case in which the current internal count signal QH is outputted as the output signal Q at the next clock timing.

For example, in a case in which the output signal Q is "14d (1110b)," the torque vector of the motor 4 is specified by the excitation point indicated by circled number (15) in FIG. 8. The decoder 12 that received the output signal Q outputs the value obtained by twice decrementing the current value of the output signal Q, i.e., "12d (1100b)," as the internal count signal QH so that the excitation point indicated by circled number (13) in FIG. 8 is specified as the next excitation point. At this time, when the half-step drive method is selected by the excitation method switching signal MODE, the above-mentioned internal count signal QH is stored in the shift register 15 via the selector 14. When the clock signal CLK subsequently rises (or falls), the shift register 15 outputs the stored value "12d (1100b)" thereof as the output signal Q. Inputting of this output signal Q to the decoder unit 20 causes the torque vector of the motor 4 to transition to the excitation point indicated by circled number (13) in FIG. 8.

Thereafter as well, the decoder 12 generates the internal count signal QH obtained by twice decrementing the current value of the output signal Q each time the clock signal CLK rises (or falls) when the rotation direction switching signal CWCCW is at the logical level (high level in the present embodiment) that specifies negative rotation of the motor 4. However, in a case in which the current value of the output signal Q is "0d (0000b)," since the value cannot be decremented further, the next rise (or fall) of the clock signal CLK triggers a return of the internal count signal QH to "14d (1110b)."

As the decode operation described above continues, the torque vector of the motor 4 transitions in sequence counterclockwise through the excitation points indicated by circled numbers (1), (3), (5), (7), (9), (11), (13), and (15) in FIG. 8. The shaded cells in the table indicate output signals Q that can potentially be outputted from the shift register 15 during half-step driving. The non-shaded cells indicate output signals Q that have no possibility of being outputted during half-step driving (i.e., output signals Q that can be outputted only during quarter-step driving).

For example, in a case in which the output signal Q immediately prior to switching the excitation method from the quarter-step drive method to the half-step drive method is "1d (0001b)," and the excitation point indicated by circled number (2) in FIG. 6 is specified, since the excitation point specified in the quarter-step drive method prior to switching is not present in the half-step drive method after switching, the torque vector of the motor 4 must be controlled so as to transition to the closest excitation point in the rotation direction of the motor 4 (i.e., the excitation point indicated by circled number (1) in FIG. 8).

Therefore, the decoder 232 that receives the abovementioned output signal Q outputs the control signal DH2 for specifying the excitation point indicated by circled number (1) in FIG. 8 as the excitation point to be specified at the timing of the switch from the quarter-step drive method to the half-step drive method, and after the excitation method has been switched from the quarter-step drive method to the half-step drive method, the decoder 12 that receives the output signal Q outputs the internal count signal QH ("14d (1110b)") for specifying the excitation point indicated by circled number (15) in FIG. 8 as the excitation point to be specified at the next clock timing.

Such an operation makes it possible to control the torque vector of the motor 4 so that the torque vector is in the closest phase in the rotation direction of the motor 4 in a case in which there is no phase that is the same as that prior to switching when the excitation method is switched from the quarter-step drive method to the half-step drive method. For the non-shaded cells, the same operation as described above is performed as well in cases in which other output signals Q are outputted.

FIG. 17A is a table showing the correlation between the output signal Q (Q0 through Q3) and internal count signal QF (QF0 through QF3) during positive rotation of the motor. The output signal Q, which is the output value of the shift register 15, specifies the current state of the motor 4, and the excitation point noted to the right thereof indicates the excitation point that is specified by the decoder 221 (control signal DF1) in accordance with the output signal Q. On the other hand, the internal count signal QF, which is the output value of the decoder 11, specifies the next state of the motor 4, and the excitation point noted to the right thereof indicates the expected excitation point (next excitation point in the full-step drive method) that is specified by the decoder 221 (control signal DF1) in accordance with the output signal Q in a case in which the current internal count signal QF is outputted as the output signal Q at the next clock timing.

For example, in a case in which the output signal Q is "0d (0000b)," the torque vector of the motor 4 is specified by the excitation point indicated by circled number (1) in FIG. 10. The decoder 11 that receives the output signal Q outputs the value obtained by four times incrementing the current value of the output signal Q, i.e., "4d (0100b)," as the internal count signal QF so that the excitation point indicated by circled number (5) in FIG. 10 is specified as the next excitation point. At this time, when the full-step drive method is selected by the excitation method switching signal MODE, the abovementioned internal count signal QF is stored in the shift register 15 via the selector 14. When the clock signal CLK subsequently rises (or falls), the shift register 15 outputs the stored value "4d (0100b)" thereof as the output signal Q. Inputting of this output signal Q to the decoder unit 20 causes the torque vector of the motor 4 to transition to the excitation point indicated by circled number (5) in FIG. 10.

Thereafter as well, the decoder 11 generates the internal count signal QF obtained by four times incrementing the current value of the output signal Q each time the clock signal CLK rises (or falls) when the rotation direction switching signal CWCCW is at the logical level (low level in the present embodiment) that specifies positive rotation of the motor 4. However, in a case in which the current value of the output signal Q is "12d (1100b)," since the value cannot be incremented further, the next rise (or fall) of the clock signal CLK triggers a return of the internal count signal QF (*2) to "0d (0000b)."

As the decode operation described above continues, the torque vector of the motor 4 transitions in sequence clockwise through the excitation points indicated by circled numbers (1), (5), (9), and (13) in FIG. 10. The shaded cells in the table indicate output signals Q that can potentially be outputted from the shift register 15 during full-step driving. The non-shaded cells indicate output signals Q that have no possibility of being outputted during full-step driving (i.e., output signals Q that can be outputted only during quarter-step driving or half-step driving).

For example, in a case in which the output signal Q immediately prior to switching the excitation method from the quarter-step drive method to the full-step drive method is "1d (0001b)," and the excitation point indicated by circled number (2) in FIG. 6 is specified, since the excitation point specified in the quarter-step drive method prior to switching is not present in the full-step drive method after switching, the torque vector of the motor 4 must be controlled so as to transition to the closest excitation point in the rotation direction of the motor 4 (i.e., the excitation point indicated by circled number (5) in FIG. 10).

Therefore, the decoder 221 that receives the abovementioned output signal Q outputs the control signal DF1 for specifying the excitation point indicated by circled number (5) in FIG. 10 as the excitation point to be specified at the timing of the switch from the quarter-step drive method to the full-step drive method, and after the excitation method has been switched from the quarter-step drive method to the full-step drive method, the decoder 11 that receives the output signal Q outputs the internal count signal QF ("8d (1000b)") for specifying the excitation point indicated by circled number (9) in FIG. 10 as the excitation point to be specified at the next clock timing.

Such an operation makes it possible to control the torque vector of the motor 4 so that the torque vector is in the closest phase in the rotation direction of the motor 4 in a case in which there is no phase that is the same as that prior to switching when the excitation method is switched from the quarter-step drive method to the full-step drive method. For the non-shaded cells, the same operation as described above is performed as well in cases in which other output signals Q are outputted.

FIG. 17B is a table showing the correlation between the output signal Q (Q0 through Q3) and internal count signal QF (QF0 through QF3) during negative rotation of the motor. The output signal Q, which is the output value of the shift register 15, specifies the current state of the motor 4, and the excitation point noted to the right thereof indicates the excitation point that is specified by the decoder 231 (control signal DF2) in accordance with the output signal Q. On the other hand, the internal count signal QF, which is the output value of the decoder 11, specifies the next state of the motor 4, and the excitation point noted to the right thereof indicates the expected excitation point (next excitation point in the full-step drive method) that is specified by the decoder 231 (control signal DF2) in accordance with the output signal Q in a case in which the current internal count signal QF is outputted as the output signal Q at the next clock timing.

For example, in a case in which the output signal Q is "12d (1100b)," the torque vector of the motor 4 is specified by the excitation point indicated by circled number (13) in FIG. 10. The decoder 11 that receives the output signal Q outputs the value obtained by four times decrementing the current value of the output signal Q, i.e., "8d (1000b)," as the internal count signal QF so that the excitation point indicated by circled number (9) in FIG. 10 is specified as the next excitation point. At this time, when the full-step drive method is selected by the excitation method switching signal MODE, the abovementioned internal count signal QF is stored in the shift register 15 via the selector 14. When the clock signal CLK subsequently rises (or falls), the shift register 15 outputs the stored value "8d (1000b)" thereof as the output signal Q. Inputting of this output signal Q to the decoder unit 20 causes the torque vector of the motor 4 to transition to the excitation point indicated by circled number (9) in FIG. 10.

Thereafter as well, the decoder 11 generates the internal count signal QF obtained by four times decrementing the current value of the output signal Q each time the clock signal CLK rises (or falls) when the rotation direction switching signal CWCCW is at the logical level (high level in the present embodiment) that specifies negative rotation of the motor. However, in a case in which the current value of the output signal Q is "0d (0000b)," since the value cannot be decremented further, the next rise (or fall) of the clock signal CLK triggers a return of the internal count signal QF (*2) to "12d (1100b)."

As the decode operation described above continues, the torque vector of the motor 4 transitions in sequence counter-clockwise through the excitation points indicated by circled numbers (1), (5), (9), and (13) in FIG. 10. The shaded cells in the table indicate output signals Q that can potentially be outputted from the shift register 15 during full-step driving. The non-shaded cells indicate output signals Q that have no possibility of being outputted during full-step driving (i.e., output signals Q that can be outputted only during quarter-step driving or half-step driving).

For example, in a case in which the output signal Q immediately prior to switching the excitation method from the quarter-step drive method to the full-step drive method is "1d (00001b)," and the excitation point indicated by circled number (2) in FIG. 6 is specified, since the excitation point specified in the quarter-step drive method prior to switching is not present in the full-step drive method after switching, the torque vector of the motor 4 must be controlled so as to transition to the closest excitation point in the rotation direction of the motor 4 (i.e., the excitation point indicated by circled number (1) in FIG. 10).

Therefore, the decoder 231 that receives the abovementioned output signal Q outputs the control signal DF2 for specifying the excitation point indicated by circled number (1) in FIG. 10 as the excitation point to be specified at the timing of the switch from the quarter-step drive method to the full-step drive method, and after the excitation method has been switched from the quarter-step drive method to the full-step drive method, the decoder 11 that receives the output signal Q outputs the internal count signal QF ("12d (1100b)") for specifying the excitation point indicated by circled number (13) in FIG. 10 as the excitation point to be specified at the next clock timing.

Such an operation makes it possible to control the torque vector of the motor 4 so that the torque vector is in the closest phase in the rotation direction of the motor 4 in a case in which there is no phase that is the same as that prior to switching when the excitation method is switched from the quarter-step drive method to the full-step drive method. For the non-shaded cells, the same operation as described above is performed as well in cases in which other output signals Q are outputted. The same operation as described above is also performed in cases in which there is no phase that is the same as that prior to switching when the excitation method is switched from the half-step drive method to the full-step drive method.

FIGS. 18, 19, and 20 are truth tables showing the correlation of the output signal Q, excitation point, and clock number for each case of positive rotation/negative rotation of the motor 4, and show states during quarter-step driving, during half-step driving, and during full-step driving, respectively.

In FIGS. 18, 19, and 20, the rows marked with circles show the transition destinations of output signals Q that can be outputted from the shift register 15, i.e., output signals Q for pulse inputs of the clock signal CLK, in states in which each excitation method is selected. As indicated by the circles, it is apparent that the counter unit 10 functions as a quaternary counter during full-step driving, an octal counter during half-step driving, and a hexadecimal counter during quarter-step driving.

The rows not marked with a circle indicate output signals Q that have no possibility of being outputted from the shift register 15, i.e., output signals Q that can be outputted from the shift register 15 only in a state in which another excitation method is selected, for each selection of an excitation state. Specifically, the output signals Q of the rows not marked with a circle are referenced in order to appropriately control the torque vector of the motor 4 during switching of the excitation method.

FIGS. 21A and 21B are tables comparing the new and old excitation points with respect to the output signal Q (Q0 through Q3), and show states during positive rotation of the motor and negative rotation of the motor, respectively. Shading is applied to some cells in the tables to clarify where the excitation points coincide across excitation methods.

Figure 27:
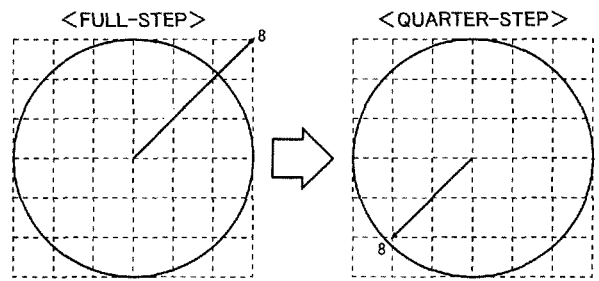
FIG. 27 is a torque vector diagram showing the problems that occur during switching of the excitation method.

As shown in these drawings, the correlation between the output signal Q (number of pulses of the clock signal CLK) and the phase (excitation point) of the torque vector is fundamentally inconsistent in the conventional motor drive device, and when the excitation method is switched during driving of the motor, the torque vector of the motor is transitioned to an unintended phase, which can cause problems with the stepping operation of the motor. This problem was previously described with reference to FIG. 27.

In the motor drive device 1 of the present invention, however, since the correlation between the output signal Q and the excitation point is completely consistent between the excitation methods, the excitation points before and after switching can be perfectly matched in the case of switching from the full-step drive method to the half-step drive method or the quarter-step drive method, or in the case of switching from the half-step drive method to the quarter-step drive method.

In the case of switching from the quarter-step drive method to the half-step drive method or the full-step drive method, or the case of switching from the half-step drive method to the full-step drive method, the excitation point that was specified in the excitation method prior to switching does not necessarily exist in the excitation method after switching (see cells containing "–" in the tables). However, in the motor drive device 1 of the present invention, since the torque vector of the motor 4 is controlled so as to transition to the closest excitation point in the rotation direction of the motor 4 as described above, such situations as unintended backwards rotation of the motor 4 do not occur.

In the motor drive device 1 of the present invention, the greatest change in phase of the torque vector during switching of the excitation method occurs in a case in which the excitation point after switching has transitioned to the excitation point indicated by circled number (5) in FIG. 10 as a result of switching the excitation method to the full-step drive method from a state in which the excitation point indicated by circled number (2) in FIG. 6 is specified during quarter-step driving, for example. In this case, the phase of the torque vector of the motor 4 rotates an electrical angle of 67.5°, but even such a large displacement poses little risk of significant problems in the step driving of the motor 4.

Figure 22:
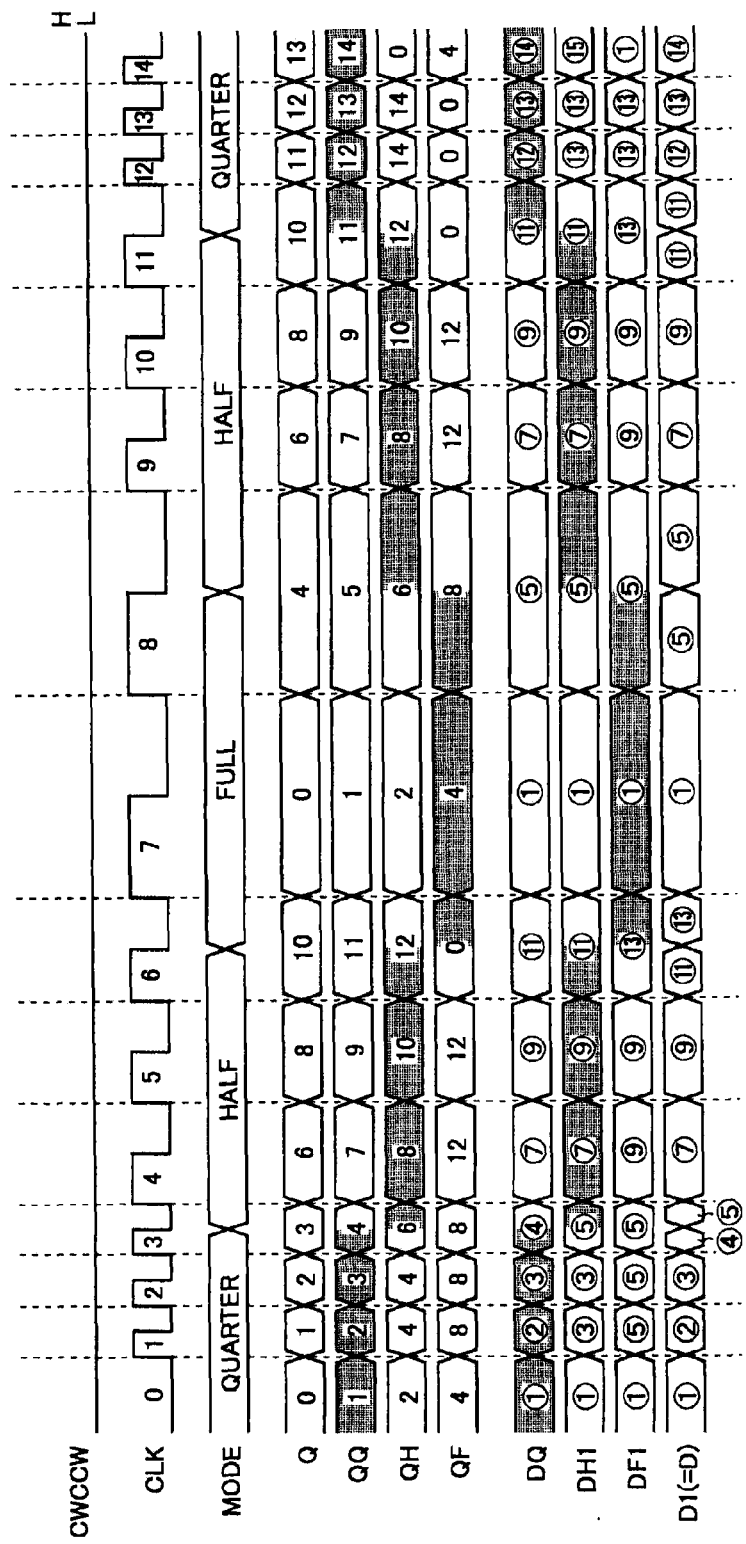
FIG. 22 is a timing chart showing the operation of switching the excitation method during positive rotation of the motor.

FIG. 22 is a timing chart showing the operation of switching the excitation method during positive rotation of the motor, and shows, in order from the top, the rotation direction switching signal CWCCW; the clock signal CLK; the excitation method switching signal MODE, the output signal Q outputted from the shift register 15; the internal count signal QQ outputted from the decoder 13; the internal count signal QH outputted from the decoder 12; the internal count signal QF outputted from the decoder 11; the control signal DQ outputted from the decoder 21; the control signal DH1 outputted from the decoder 222; the control signal DF1 outputted from the decoder 221; and the control signal D1 outputted from the selector 223 (as well as the control signal D (=DVS) outputted from the selector 24).

In FIG. 22, the rotation direction switching signal CWCCW is fixed at the low level so that the motor 4 is driven in the positive rotation direction.

For convenience in description, numbers "0" through "14" indicating the pulse number are attached to the pulses in the clock signal CLK. The frequency of the clock signal CLK is variably controlled in accordance with the selected excitation method so that the speed of the motor 4 is kept constant. More specifically, in a case in which the frequency of the clock signal CLK during quarter-step driving is f, the frequency of the clock signal CLK is f/2 during half-step driving, and the frequency of the clock signal CLK is f/4 during full-step driving.

The output values for the output signal Q and the internal count signals QQ, QH, QF are indicated in decimal notation, and the excitation points specified by each of the control signals DQ, DH1, DF1 and the control signal D1(=D) are indicated by circled numbers. These excitation points correspond to the excitation points shown in FIGS. 6, 8, and 10.

Among the internal count signals QQ, QH, QF, shading indicates those signals that are selected by the selector 14 and stored in the shift register 15. Among the control signals DQ, DH1, DF1, shading indicates those signals that are selected by the selector 223 (and selector 24) and outputted as the control signal D1(=D).

The operation whereby the excitation method switches through the sequence of quarter-step driving, half-step driving, full-step driving, half-step driving, and quarter-step driving will be described in detail with reference to FIG. 22.

Before a pulse of the clock signal CLK is inputted, "0" (initial value) is outputted as the output signal Q, and "1," "2," and "4" are outputted as the internal count signals QQ, QH, QF, respectively, on the basis of the output signal Q. At this time, the internal count signal QQ is selected by the selector 14 on the basis of selection of the quarter-step drive method by the excitation method switching signal MODE, and the output value "1" of the internal count signal QQ is stored in the shift register 15. The excitation point indicated by circled number (1) is specified by all of the control signals DQ, DH1, DF1 on the basis of the abovementioned output signal Q. At this time, the control signal DQ is selected by the selector 223 on the basis of selection of the quarter-step drive method by the excitation method switching signal MODE, and the excitation point indicated by circled number (1) is specified by the control signal D1(=D).

When the first pulse subsequently rises in the clock signal CLK, the stored value "1" of the shift register 15 is outputted as the output signal Q, and based on this output signal Q, the internal count signals QQ, QH, QF are rewritten to "2," "4," and "8," respectively. At this time, the internal count signal QQ is selected by the selector 14 on the basis of selection of the quarter-step drive method by the excitation method switching signal MODE, and the output value "2" of the internal count signal QQ is stored in the shift register 15. The excitation points indicated by circled numbers (2), (3), and (5) are specified by the control signals DQ, DH1, DF1, respectively, on the basis of the abovementioned output signal Q. At this time, the control signal DQ is selected by the selector 223 on the basis of selection of the quarter-step drive method by the excitation method switching signal MODE, and the excitation point indicated by circled number (2) is specified by the control signal D1(=D). The torque vector of the motor 4 is thereby step-driven from the excitation point indicated by circled number (1) to the excitation point indicated by circled number (2).

The same operation as described above is performed at the rise of each of the second and third pulses in the clock signal CLK thereafter, and the torque vector of the motor 4 is step-driven in sequence from the excitation point indicated by circled number (2) to the excitation points indicated by circled numbers (3) and (4).

When the third pulse has risen in the clock signal CLK, "3" is outputted as the output signal Q, and based on this output signal Q, "4," "6," and "8" are outputted as the internal count signals QQ, QH, QF, respectively. At this time, when the excitation method is switched to the half-step drive method using the excitation method switching signal MODE, the internal count signal QH is selected by the selector 14 instead of the internal count signal QQ, and the stored value of the shift register 15 is rewritten from "4" to "6."

When the third pulse has risen in the clock signal CLK, the excitation points indicated by circled numbers (4), (5), and (5) are specified by the control signals DQ, DH1, DF1, respectively, on the basis of the output signal Q described above. At this time, when the excitation method is switched to the half-step drive method using the excitation method switching signal MODE, the control signal DH1 is selected by the selector 223 instead of the control signal DQ, and the excitation point indicated by circled number (5) is specified instead of the excitation point indicated by circled number (4) by the control signal D1(=D). Specifically, the excitation point indicated by circled number (4) does not exist in the half-step drive method to which the excitation method is switched, but even in this case, the torque vector of the motor 4 is appropriately controlled so as to transition to the closest excitation point (i.e., the excitation point indicated by circled number (5)) in the rotation direction of the motor 4.

When the fourth pulse subsequently rises in the clock signal CLK, the stored value "6" of the shift register 15 is outputted as the output signal Q, and based on this output signal Q, the internal count signals QQ, QH, QF are rewritten to "7," "8," and "12," respectively. At this time, the internal count signal QH is selected by the selector 14 on the basis of selection of the half-step drive method by the excitation method switching signal MODE, and the output value "8" of the internal count signal QH is stored in the shift register 15. The excitation points indicated by circled numbers (7), (7), and (9) are specified by the control signals DQ, DH1, DF1, respectively, on the basis of the abovementioned output signal Q. At this time, the control signal DH1 is selected by the selector 223 on the basis of selection of the half-step drive method by the excitation method switching signal MODE, and the excitation point indicated by circled number (7) is specified by the control signal D1(=D). The torque vector of the motor 4 is thereby step-driven from the excitation point indicated by circled number (5) to the excitation point indicated by circled number (7).

The same operation as described above is performed at the rise of each of the fifth and sixth pulses in the clock signal CLK thereafter, and the torque vector of the motor 4 is step-driven in sequence from the excitation point indicated by circled number (7) to the excitation points indicated by circled numbers (9) and (11).

When the sixth pulse has risen in the clock signal CLK, "10" is outputted as the output signal Q, and based on this output signal Q, "11," "12," and "0" are outputted as the internal count signals QQ, QH, QF, respectively. At this time, when the excitation method is switched to the full-step drive method using the excitation method switching signal MODE, the internal count signal QF is selected by the selector 14 instead of the internal count signal QH, and the stored value of the shift register 15 is rewritten from "12" to "0."

When the sixth pulse has risen in the clock signal CLK, the excitation points indicated by circled numbers (11), (11), and (13) are specified by the control signals DQ, DH1, DF1, respectively, on the basis of the output signal Q described above. At this time, when the excitation method is switched to the full-step drive method using the excitation method switching signal MODE, the control signal DF1 is selected by the selector 223 instead of the control signal DH1, and the excitation point indicated by circled number (13) is specified instead of the excitation point indicated by circled number (11) by the control signal D1(=D). Specifically, the excitation point indicated by circled number (11) does not exist in the full-step drive method to which the excitation method is switched, but even in this case, the torque vector of the motor 4 is appropriately controlled so as to transition to the closest excitation point (i.e., the excitation point indicated by circled number (13)) in the rotation direction of the motor 4.

When the seventh pulse subsequently rises in the clock signal CLK, the stored value "0" of the shift register 15 is outputted as the output signal Q, and based on this output signal Q, the internal count signals QQ, QH, QF are rewritten to "1," "2," and "4," respectively. At this time, the internal count signal QF is selected by the selector 14 on the basis of selection of the full-step drive method by the excitation method switching signal MODE, and the output value "4" of the internal count signal QF is stored in the shift register 15. The excitation point indicated by circled number (1) is specified by all the control signals DQ, DH1, DF1 on the basis of the abovementioned output signal Q. At this time, the control signal DF1 is selected by the selector 223 on the basis of selection of the full-step drive method by the excitation method switching signal MODE, and the excitation point indicated by circled number (1) is specified by the control signal D1(=D). The torque vector of the motor 4 is thereby step-driven from the excitation point indicated by circled number (13) to the excitation point indicated by circled number (1).

Thereafter as well, when the eighth pulse rises in the clock signal CLK, the same operation as described above is performed, and the torque vector of the motor 4 is step-driven from the excitation point indicated by circled number (1) to the excitation point indicated by circled number (5).

When the eighth pulse has risen in the clock signal CLK, "4" is outputted as the output signal Q, and based on this output signal Q, "5," "6," and "8" are outputted as the internal count signals QQ, QH, QF, respectively. At this time, when the excitation method is switched to the half-step drive method using the excitation method switching signal MODE, the internal count signal QH is selected by the selector 14 instead of the internal count signal QF, and the stored value of the shift register 15 is rewritten from "8" to "6."

When the eighth pulse has risen in the clock signal CLK, the excitation point indicated by circled number (5) is specified by all the control signals DQ, DH1, DF1 on the basis of the output signal Q described above. At this time, when the excitation method is switched to the half-step drive method using the excitation method switching signal MODE, the control signal DH1 is selected by the selector 223 instead of the control signal DF1, and the excitation point indicated by circled number (5), the same as before the excitation method was switched, is specified by the control signal D1(=D). Specifically, in a case in which an excitation point is present that is the same as that prior to switching the excitation method, the torque vector of the motor 4 is appropriately controlled so that the same excitation point is maintained.

When the ninth pulse subsequently rises in the clock signal CLK, the stored value "6" of the shift register 15 is outputted as the output signal Q, and based on this output signal Q, the internal count signals QQ, QH, QF are rewritten to "7," "8," and "12," respectively. At this time, the internal count signal QH is selected by the selector 14 on the basis of selection of the half-step drive method by the excitation method switching signal MODE, and the output value "8" of the internal count signal QH is stored in the shift register 15. The excitation points indicated by circled numbers (7), (7), and (9) are specified by the control signals DQ, DH1, DF1, respectively, on the basis of the abovementioned output signal Q. At this time, the control signal DH1 is selected by the selector 223 on the basis of selection of the half-step drive method by the excitation method switching signal MODE, and the excitation point indicated by circled number (7) is specified by the control signal D1(=D). The torque vector of the motor 4 is thereby step-driven from the excitation point indicated by circled number (5) to the excitation point indicated by circled number (7).

The same operation as described above is performed at the rise of each of the tenth and eleventh pulses in the clock signal CLK thereafter, and the torque vector of the motor 4 is step-driven in sequence from the excitation point indicated by circled number (7) to the excitation points indicated by circled numbers (9) and (11).

When the eleventh pulse has risen in the clock signal CLK, "10" is outputted as the output signal Q, and based on this output signal Q, "11," "12," and "0" are outputted as the internal count signals QQ, QH, QF, respectively. At this time, when the excitation method is switched to the quarter-step drive method using the excitation method switching signal MODE, the internal count signal QQ is selected by the selector 14 instead of the internal count signal QH, and the stored value of the shift register 15 is rewritten from "12" to "11."

When the eleventh pulse has risen in the clock signal CLK, the excitation points indicated by circled numbers (11), (11), and (13) are specified by the control signals DQ, DH1, DF1, respectively, on the basis of the output signal Q described above. At this time, when the excitation method is switched to the quarter-step drive method using the excitation method switching signal MODE, the control signal DQ is selected by the selector 223 instead of the control signal DH1, and the excitation point indicated by circled number (11), the same as before the excitation method was switched, is specified by the control signal D1(=D). Specifically, in a case in which an excitation point is present that is the same as that prior to switching the excitation method, the torque vector of the motor 4 is appropriately controlled so that the same excitation point is maintained.

When the twelfth pulse subsequently rises in the clock signal CLK, the stored value "11" of the shift register 15 is outputted as the output signal Q, and based on this output signal Q, the internal count signals QQ, QH, QF are rewritten to "12," "14," and "0," respectively. At this time, the internal count signal QQ is selected by the selector 14 on the basis of selection of the quarter-step drive method by the excitation method switching signal MODE, and the output value "12" of the internal count signal QQ is stored in the shift register 15. The excitation points indicated by circled numbers (12), (13), and (13) are specified by the control signals DQ, DH1, DF1, respectively, on the basis of the abovementioned output signal Q. At this time, the control signal DQ is selected by the selector 223 on the basis of selection of the quarter-step drive method by the excitation method switching signal MODE, and the excitation point indicated by circled number (12) is specified by the control signal D1 (=D). The torque vector of the motor 4 is thereby step-driven from the excitation point indicated by circled number (11) to the excitation point indicated by circled number (12).

The same operation as described above is performed at the rise of each of the thirteenth and fourteenth pulses in the clock signal CLK thereafter, and the torque vector of the motor 4 is step-driven in sequence from the excitation point indicated by circled number (12) to the excitation points indicated by circled numbers (13) and (14).

Figure 23:
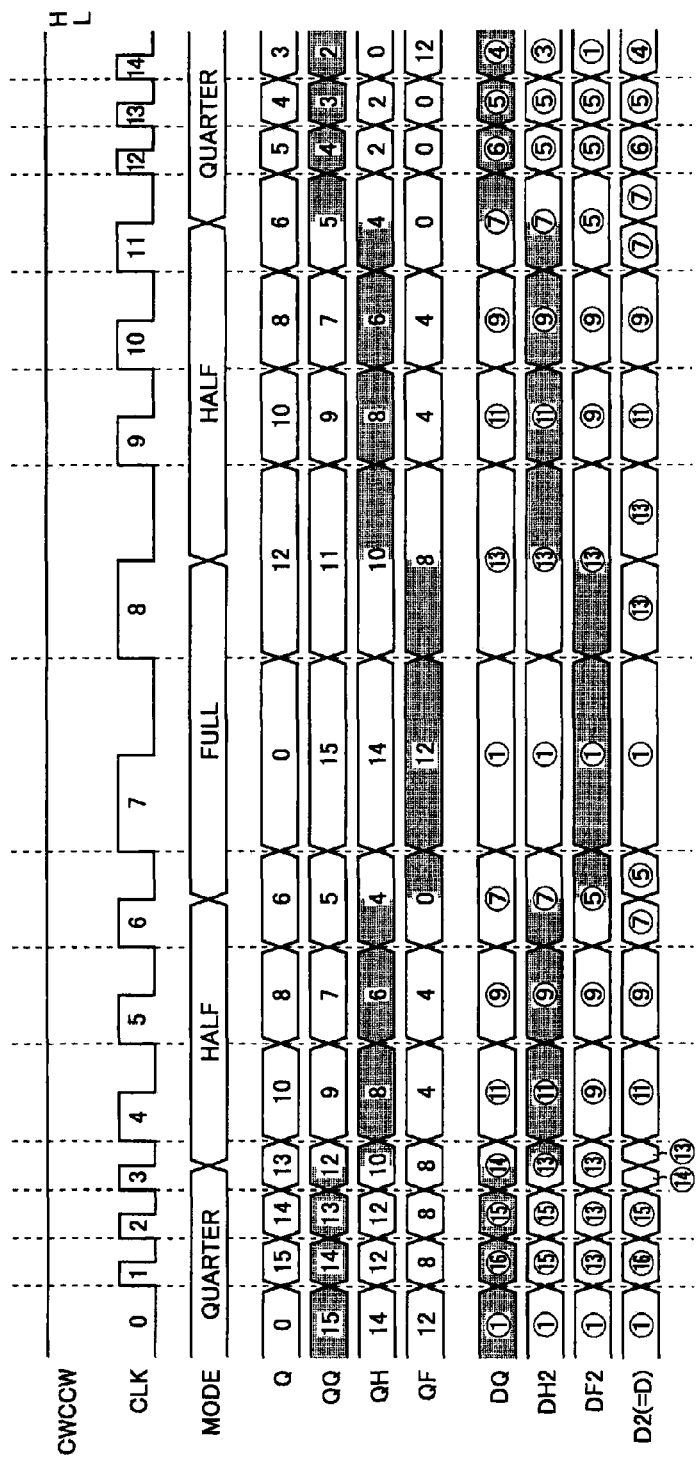
FIG. 23 is a timing chart showing the operation of switching the excitation method during negative rotation of the motor.

FIG. 23 is a timing chart showing the operation of switching the excitation method during negative rotation of the motor, and shows, in order from the top, the rotation direction switching signal CWCCW; the clock signal CLK; the excitation method switching signal MODE, the output signal Q outputted from the shift register 15; the internal count signal QQ outputted from the decoder 13; the internal count signal QH outputted from the decoder 12; the internal count signal QF outputted from the decoder 11; the control signal DQ outputted from the decoder 21; the control signal DH2 outputted from the decoder 232; the control signal DF2 outputted from the decoder 231; and the control signal D2 outputted from the selector 233 (as well as the control signal D (=DVS) outputted from the selector 24).

In FIG. 23, the rotation direction switching signal CWCCW is fixed at the high level so that the motor 4 is driven in the negative rotation direction.

For convenience in description, numbers "0" through "14" indicating the pulse number are attached to the pulses in the clock signal CLK. The frequency of the clock signal CLK is variably controlled in accordance with the selected excitation method so that the speed of the motor 4 is kept constant. More specifically, in a case in which the frequency of the clock signal CLK during quarter-step driving is f, the frequency of the clock signal CLK is f/2 during half-step driving, and the frequency of the clock signal CLK is f/4 during full-step driving.

The output values for the output signal Q and the internal count signals QQ, QH, QF are indicated in decimal notation, and the excitation points specified by each of the control signals DQ, DH1, DF1 and the control signal D1(=D) are indicated by circled numbers. These excitation points correspond to the excitation points shown in FIGS. 6, 8, and 10.

Among the internal count signals QQ, QH, QF, shading indicates those signals that are selected by the selector 14 and stored in the shift register 15. Among the control signals DQ, DH1, DF1, shading indicates those signals that are selected by the selector 223 (and selector 24) and outputted as the control signal D2(=D).

The operation whereby the excitation method switches through the sequence of quarter-step driving, half-step driving, full-step driving, half-step driving, and quarter-step driving will be described in detail with reference to FIG. 23.

Before a pulse of the clock signal CLK is inputted, "0" (initial value) is outputted as the output signal Q, and "15," "14," and "12" are outputted as the internal count signals QQ, QH, QF, respectively, on the basis of the output signal Q. At this time, the internal count signal QQ is selected by the selector 14 on the basis of selection of the quarter-step drive method by the excitation method switching signal MODE, and the output value "15" of the internal count signal QQ is stored in the shift register 15. The excitation point indicated by circled number (1) is specified by all of the control signals DQ, DH2, DF2 on the basis of the abovementioned output signal Q. At this time, the control signal DQ is selected by the selector 233 on the basis of selection of the quarter-step drive method by the excitation method switching signal MODE, and the excitation point indicated by circled number (1) is specified by the control signal D2(=D).

When the first pulse subsequently rises in the clock signal CLK, the stored value "15" of the shift register 15 is outputted as the output signal Q, and based on this output signal Q, the internal count signals QQ, QH, QF are rewritten to "14," "12," and "8," respectively. At this time, the internal count signal QQ is selected by the selector 14 on the basis of selection of the quarter-step drive method by the excitation method switching signal MODE, and the output value "14" of the internal count signal QQ is stored in the shift register 15. The excitation points indicated by circled numbers (16), (15), and (13) are specified by the control signals DQ, DH2, DF2, respectively, on the basis of the abovementioned output signal Q. At this time, the control signal DQ is selected by the selector 233 on the basis of selection of the quarter-step drive method by the excitation method switching signal MODE, and the excitation point indicated by circled number (16) is specified by the control signal D2(=D). The torque vector of the motor 4 is thereby step-driven from the excitation point indicated by circled number (1) to the excitation point indicated by circled number (16).

The same operation as described above is performed at the rise of each of the second and third pulses in the clock signal CLK thereafter, and the torque vector of the motor 4 is step-driven in sequence from the excitation point indicated by circled number (16) to the excitation points indicated by circled numbers (15) and (14).

When the third pulse has risen in the clock signal CLK, "13" is outputted as the output signal Q, and based on this output signal Q, "12," "10," and "8" are outputted as the internal count signals QQ, QH, QF, respectively. At this time, when the excitation method is switched to the half-step drive method using the excitation method switching signal MODE, the internal count signal QH is selected by the selector 14 instead of the internal count signal QQ, and the stored value of the shift register 15 is rewritten from "12" to "10."

When the third pulse has risen in the clock signal CLK, the excitation points indicated by circled numbers (14), (13), and (13) are specified by the control signals DQ, DH2, DF2, respectively, on the basis of the output signal Q described above. At this time, when the excitation method is switched to the half-step drive method using the excitation method switching signal MODE, the control signal DH2 is selected by the selector 233 instead of the control signal DQ, and the excitation point indicated by circled number (13) is specified instead of the excitation point indicated by circled number (14) by the control signal D2(=D). Specifically, the excitation point indicated by circled number (14) does not exist in the half-step drive method to which the excitation method is switched, but even in this case, the torque vector of the motor 4 is appropriately controlled so as to transition to the closest excitation point (i.e., the excitation point indicated by circled number (13)) in the rotation direction of the motor 4.

When the fourth pulse subsequently rises in the clock signal CLK, the stored value "10" of the shift register 15 is outputted as the output signal Q, and based on this output signal Q, the internal count signals QQ, QH, QF are rewritten to "9," "8," and "4," respectively. At this time, the internal count signal QH is selected by the selector 14 on the basis of selection of the half-step drive method by the excitation method switching signal MODE, and the output value "8" of the internal count signal QH is stored in the shift register 15. The excitation points indicated by circled numbers (11), (11), and (9) are specified by the control signals DQ, DH2, DF2, respectively, on the basis of the abovementioned output signal Q. At this time, the control signal DH2 is selected by the selector 233 on the basis of selection of the half-step drive method by the excitation method switching signal MODE, and the excitation point indicated by circled number (11) is specified by the control signal D2(=D). The torque vector of the motor 4 is thereby step-driven from the excitation point indicated by circled number (13) to the excitation point indicated by circled number (11).

The same operation as described above is performed at the rise of each of the fifth and sixth pulses in the clock signal CLK thereafter, and the torque vector of the motor 4 is step-driven in sequence from the excitation point indicated by circled number (11) to the excitation points indicated by circled numbers (9) and (7).

When the sixth pulse has risen in the clock signal CLK, "6" is outputted as the output signal Q, and based on this output signal Q, "5," "4," and "0" are outputted as the internal count signals QQ, QH, QF, respectively. At this time, when the excitation method is switched to the full-step drive method using the excitation method switching signal MODE, the internal count signal QF is selected by the selector 14 instead of the internal count signal QH, and the stored value of the shift register 15 is rewritten from "4" to "0."

When the sixth pulse has risen in the clock signal CLK, the excitation points indicated by circled numbers (7), (7), and (5) are specified by the control signals DQ, DH2, DF2, respectively, on the basis of the output signal Q described above. At this time, when the excitation method is switched to the full-step drive method using the excitation method switching signal MODE, the control signal DF2 is selected by the selector 233 instead of the control signal DH2, and the excitation point indicated by circled number (5) is specified instead of the excitation point indicated by circled number (7) by the control signal D2(=D). Specifically, the excitation point indicated by circled number (7) does not exist in the full-step drive method to which the excitation method is switched, but even in this case, the torque vector of the motor 4 is appropriately controlled so as to transition to the closest excitation point (i.e., the excitation point indicated by circled number (5)) in the rotation direction of the motor 4.

When the seventh pulse subsequently rises in the clock signal CLK, the stored value "0" of the shift register 15 is outputted as the output signal Q, and based on this output signal Q, the internal count signals QQ, QH, QF are rewritten to "15," "14," and "12," respectively. At this time, the internal count signal QF is selected by the selector 14 on the basis of selection of the full-step drive method by the excitation method switching signal MODE, and the output value "12" of the internal count signal QF is stored in the shift register 15. The excitation point indicated by circled number (1) is specified by all the control signals DQ, DH2, DF2 on the basis of the abovementioned output signal Q. At this time, the control signal DF2 is selected by the selector 233 on the basis of selection of the full-step drive method by the excitation method switching signal MODE, and the excitation point indicated by circled number (1) is specified by the control signal D2(=D). The torque vector of the motor 4 is thereby step-driven from the excitation point indicated by circled number (5) to the excitation point indicated by circled number (1).

Thereafter as well, when the eighth pulse rises in the clock signal CLK, the same operation as described above is performed, and the torque vector of the motor 4 is step-driven from the excitation point indicated by circled number (1) to the excitation point indicated by circled number (13).

When the eighth pulse has risen in the clock signal CLK, "12" is outputted as the output signal Q, and based on this output signal Q, "11," "10," and "8" are outputted as the internal count signals QQ, QH, QF, respectively. At this time, when the excitation method is switched to the half-step drive method using the excitation method switching signal MODE, the internal count signal QH is selected by the selector 14 instead of the internal count signal QF, and the stored value of the shift register 15 is rewritten from "8" to "10."

When the eighth pulse has risen in the clock signal CLK, the excitation point indicated by circled number (13) is specified by all the control signals DQ, DH2, DF2, on the basis of the output signal Q described above. At this time, when the excitation method is switched to the half-step drive method using the excitation method switching signal MODE, the control signal DH2 is selected by the selector 233 instead of the control signal DF2, and the excitation point indicated by circled number (13), the same as before the excitation method was switched, is specified by the control signal D2(=D). Specifically, in a case in which an excitation point is present that is the same as that prior to switching the excitation method, the torque vector of the motor 4 is appropriately controlled so that the same excitation point is maintained.

When the ninth pulse subsequently rises in the clock signal CLK, the stored value "10" of the shift register 15 is outputted as the output signal Q, and based on this output signal Q, the internal count signals QQ, QH, QF are rewritten to "9," "8," and "4," respectively. At this time, the internal count signal QH is selected by the selector 14 on the basis of selection of the half-step drive method by the excitation method switching signal MODE, and the output value "8" of the internal count signal QH is stored in the shift register 15. The excitation points indicated by circled numbers (11), (11), and (9) are specified by the control signals DQ, DH2, DF2, respectively, on the basis of the abovementioned output signal Q. At this time, the control signal DH2 is selected by the selector 233 on the basis of selection of the half-step drive method by the excitation method switching signal MODE, and the excitation point indicated by circled number (11) is specified by the control signal D2(=D). The torque vector of the motor 4 is thereby step-driven from the excitation point indicated by circled number (13) to the excitation point indicated by circled number (11).

The same operation as described above is performed at the rise of each of the tenth and eleventh pulses in the clock signal CLK thereafter, and the torque vector of the motor 4 is step-driven in sequence from the excitation point indicated by circled number (11) to the excitation points indicated by circled numbers (9) and (7).

When the eleventh pulse has risen in the clock signal CLK, "6" is outputted as the output signal Q, and based on this output signal Q, "5," "4," and "0" are outputted as the internal count signals QQ, QH, QF, respectively. At this time, when the excitation method is switched to the quarter-step drive method using the excitation method switching signal MODE, the internal count signal QQ is selected by the selector 14 instead of the internal count signal QH, and the stored value of the shift register 15 is rewritten from "4" to "5."

When the eleventh pulse has risen in the clock signal CLK, the excitation points indicated by circled numbers (7), (7), and (5) are specified by the control signals DQ, DH2, DF2, respectively, on the basis of the output signal Q described above. At this time, when the excitation method is switched to the quarter-step drive method using the excitation method switching signal MODE, the control signal DQ is selected by the selector 233 instead of the control signal DH2, and the excitation point indicated by circled number (7), the same as before the excitation method was switched, is specified by the control signal D2(=D). Specifically, in a case in which an excitation point is present that is the same as that prior to switching the excitation method, the torque vector of the motor 4 is appropriately controlled so that the same excitation point is maintained.

When the twelfth pulse subsequently rises in the clock signal CLK, the stored value "5" of the shift register 15 is outputted as the output signal Q, and based on this output signal Q, the internal count signals QQ, QH, QF are rewritten to "4," "2," and "0," respectively. At this time, the internal count signal QQ is selected by the selector 14 on the basis of selection of the quarter-step drive method by the excitation method switching signal MODE, and the output value "4" of the internal count signal QQ is stored in the shift register 15. The excitation points indicated by circled numbers (6), (5), and (5) are specified by the control signals DQ, DH2, DF2, respectively, on the basis of the abovementioned output signal Q. At this time, the control signal DQ is selected by the selector 233 on the basis of selection of the quarter-step drive method by the excitation method switching signal MODE, and the excitation point indicated by circled number (6) is specified by the control signal D2(=D). The torque vector of the motor 4 is thereby step-driven from the excitation point indicated by circled number (7) to the excitation point indicated by circled number (6).

The same operation as described above is performed at the rise of each of the thirteenth and fourteenth pulses in the clock signal CLK thereafter, and the torque vector of the motor 4 is step-driven in sequence from the excitation point indicated by circled number (6) to the excitation points indicated by circled numbers (5) and (4).

An example of the operation of switching the excitation method directly between the quarter-step drive method and the full-step drive method is not shown in FIGS. 22 and 23, but it is apparent that the torque vector of the motor 4 can be appropriately controlled by the same operation as described above in a case in which the excitation method is switched in such a manner.

The control signals DH2, DF2 and the control signal D2 are not shown in FIG. 22, and the control signals DH1, DF1 and the control signal D1 are not shown in FIG. 23, but control signals not used in each description are omitted from the drawings merely for the sake of convenience in describing the case of each rotation direction of the motor 4, and in actuality, all of the decoders operate in parallel in preparation to control switching of the rotation direction of the motor 4.

However, in a case in which a control sequence is employed that prohibits simultaneous switching of the excitation method and the rotation direction, among the plurality of decoders included in the decoder unit 20, operation may be suspended for the decoder that is used for the rotation direction not currently selected, and for the decoders that are used for the excitation methods not currently selected. For example, in a case in which the motor 4 is driven in positive rotation in the quarter-step drive method, operation may be suspended for the decoder 231 for full-step driving and the decoder 232 for half-step driving that are included in the negative-rotation decoder 23. Adopting such a configuration makes it possible to reduce the power consumption of the motor drive device 1.

Figure 24:
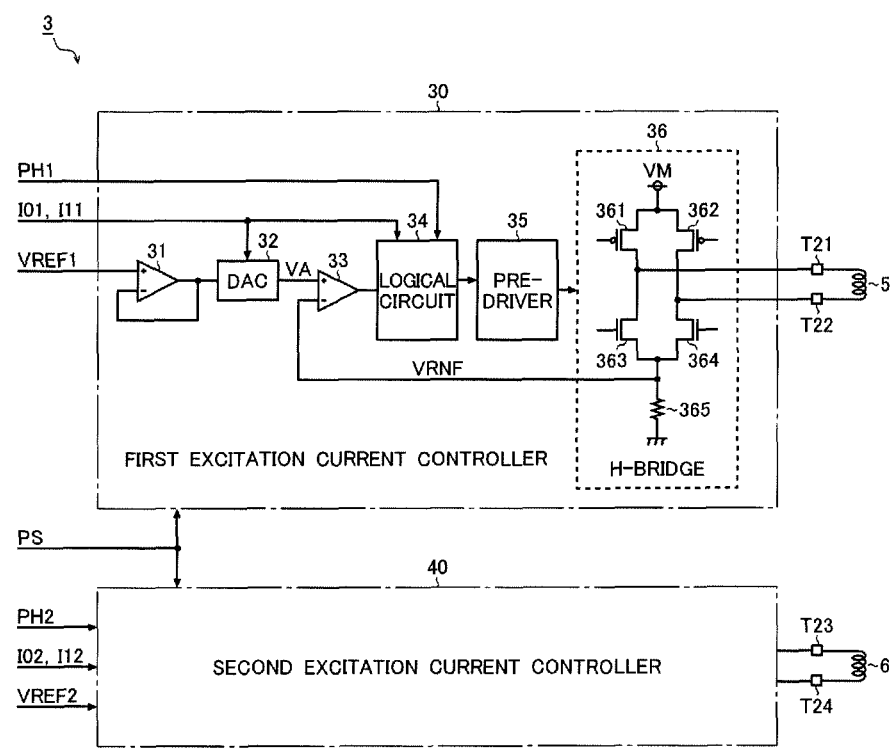
FIG. 24 is a block diagram showing an example of the structure of the drive unit 3.
Figure 25:
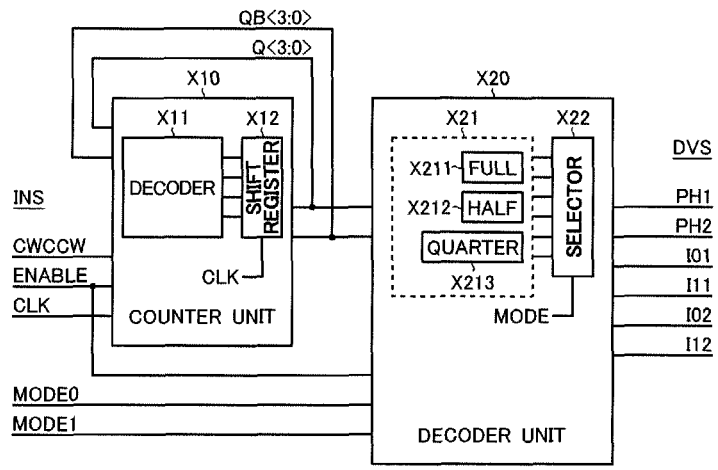
FIG. 25 is a block diagram showing an example of the conventional signal generator.
Figure 26A:
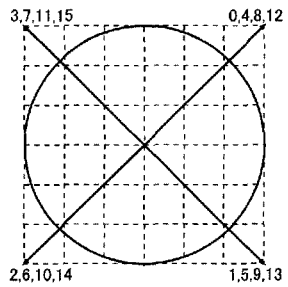
FIG. 26A is a motor torque vector diagram for the full-step drive method.
Figure 26B:
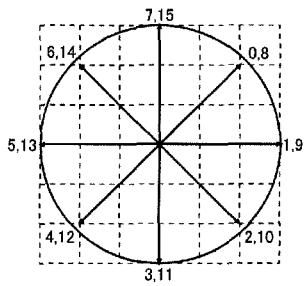
FIG. 26B is a motor torque vector diagram for the half-step drive method.
Figure 26C:
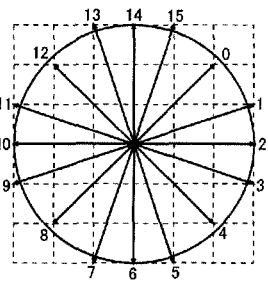
FIG. 26C is a motor torque vector diagram for the quarter-step drive method.

FIG. 24 is a block diagram (including a partial circuit diagram) showing an example of the structure of the drive unit 3. As shown in FIG. 24, the drive unit 3 is composed of a first excitation current controller 30 and a second excitation current controller 40. The first excitation current controller 30 is connected to both terminals of the motor coil 5, and controls the first excitation current I1. The second excitation current controller 40 is connected to both terminals of the motor coil 6, and controls the second excitation current I2.

The first excitation current controller 30 and the second excitation current controller 40 have basically the same internal structure. Therefore, the internal structure and operation of the first excitation current controller 30 will be described in detail as representing both the first excitation current controller 30 and the second excitation current controller 40 in FIG. 24, and no description will be given of the internal structure and operation of the second excitation current controller 40. To understand the internal structure and operation of the second excitation current controller 40, the terms "first excitation current controller 30," "first polarity signal PH1," "first current amount signals I01/I11," "first excitation current I1," "motor coil 5," and "first reference voltage VREF1" used in the detailed description below are read as "second excitation current controller 40," "second polarity signal PH2," "second current amount signals I02/I12," "second excitation current I2," "motor coil 6," and second reference voltage VREF2," respectively, and the value of the tens digit (and of the hundreds digit) in each of the reference numerals for the constituent elements of the first excitation current controller 30 is changed from "3" to "4." As for the external terminals, "external terminal T21" and "external terminal T22" are read as "external terminal T23" and "external terminal T24," respectively.

The first excitation current controller 30 is composed of an input buffer 31, a digital/analog converter 32 (referred to hereinafter as the DAC (Digital/Analog Converter) 32), a comparator 33, a logical circuit 34, a pre-driver 35, and an H-bridge 36.

A first reference voltage VREF1 is inputted to the input buffer 31 from outside the motor drive device 1. The first reference voltage VREF1 indicates the maximum value of the first excitation current I1. The input buffer 31 is a so-called voltage follower circuit, and the first reference voltage VREF1 inputted to the input buffer 31 is outputted essentially without modification.

The DAC 32 receives the first reference voltage VREF1 and the first current amount signals I01/I11 and outputs a voltage VA. The potential levels of the first current amount signals I01/I11 are varied between high-level and low-level. The DAC 32 determines the ratio of the voltage VA with respect to the first reference voltage VREF1 (i.e., the ratio of the actual current amount with respect to the maximum current amount) in accordance with the combination of potential levels of the first current amount signals I01/I11.

The comparator 33 compares the voltage VA inputted from the DAC 32 and the voltage VRNF inputted from the H-bridge 36, and outputs the result to the logical circuit 34.

The logical circuit 34 generates a control signal on the basis of the output signal of the comparator 33 and the first polarity signal PH1 for indicating the polarity of the first excitation current I1.

The pre-driver 35 amplifies the control signal inputted from the logical circuit 34 and outputs the amplified control signal to the H-bridge 36.

The H-bridge 36 is a means for varying the size of the first excitation current I1 in accordance with the operation of the H-bridge 36, and is composed of P-channel-type MOS (Metal Oxide Semiconductor) field-effect transistors 361 and 362, N-channel-type MOS field-effect transistors 363 and 364, and a resistor 365. The transistor 361 and the transistor 363 are connected in series between one terminal of the resistor 365 and a power supply node to which the power supply potential VM of the motor 4 is applied. The transistor 362 and the transistor 364 are connected in the same manner in series between the abovementioned power supply node and one terminal of the resistor 365. The other terminal of the resistor 365 is connected to a ground node.

A connection node of the transistor 361 and the transistor 363 is connected to the external terminal T21. In the same manner, a connection node of the transistor 362 and the transistor 364 is connected to the external terminal T22. One end of the motor coil 5 is connected to the external terminal T21, and the other end of the motor coil 5 is connected to the external terminal T22.

The resistor 365 is a means for converting the current (first excitation current I1) flowing to the H-bridge 36 to the voltage VRNF, and one terminal thereof is connected to the inverting input terminal (−) of the comparator 33.

In the first excitation current controller 30 configured as described above, in a case in which the first excitation current I1 is larger than a predetermined maximum value, i.e., the output of the comparator 33 indicates that VRNF>VA, the logical circuit 34 generates a control signal so as to reduce the first excitation current I1 After a predetermined time has elapsed since the start of the operation for reducing the first excitation current I1, the logical circuit 34 generates a control signal so as to increase the first excitation current I1. Through repetition of such an operation, the amount of the first excitation current I1 is maintained at a set value that is specified by the first current amount signals I01/I11.

The H-bridge 36 is also provided with a function for switching off all of the transistors 361 through 364 in a case in which the logical level of the reset signal PS dictates that the H-bridge 36 be stopped.

In addition to the embodiment described above, various modifications may be made to the configuration of the present invention within the intended scope of the invention. Specifically, the embodiment described above is given merely as an example, and is not to be construed as limiting. The technological scope of the present invention is indicated by the claims and not by the description of the embodiment above, and includes all modifications that are equivalent to the claims in meaning and scope.

For example, the quarter-step drive method, the half-step drive method, and the full-step drive method were described as examples of selections for the excitation method, but the present invention is not limited to this configuration, and other excitation methods may also, of course, be used as candidates for selection.

The present invention is a technique that can be used in a motor drive device for controlling the driving of a stepping motor, and is broadly applicable in household appliances, industrial devices, consumer devices, OA devices, and other common electronic devices that are provided with a motor drive device.

What is claimed is:

1. A motor drive device comprising:
a signal generator for generating control signals of a second input method that include a polarity signal for indicating the polarity of an excitation current that flows to a motor, and a current amount signal for indicating the amount of said excitation current, from control signals of a first input method that include a clock signal for indicating a stepping drive period of the motor, and an excitation method switching signal for indicating an excitation method of said motor; and
a drive unit for step-driving said motor on the basis of the control signals of the second input method that are generated by said signal generator; wherein
said signal generator generates control signals of the second input method from the control signals of the first input method and controls the torque vector of said motor so that the correlation between the number of pulses of said clock signal and the phase of the torque vector of said motor is held in common for all the excitation methods, with the excitation method having the greatest number of steps being used as a reference, that the torque vector of said motor as a rule is maintained in the same phase as before switching when the excitation method is switched, and that the torque vector is in the closest phase in the rotation direction of said motor in a case in which there is no phase that is the same as the phase prior to switching.

2. The motor drive device according to claim 1, wherein said signal generator comprises:
a counter unit for counting the number of pulses of said clock signal; and
a decoder unit for generating control signals of the second input method on the basis of an output signal of said counter unit and said excitation method switching signal.

3. The motor drive device according to claim 2, wherein said counter unit comprises:
a plurality of internal count decoders for generating an internal count signal for each excitation method in accordance with the fed-back output signal of said counter unit;
an internal count selector for selecting any one of said plurality of internal count signals in accordance with said excitation method switching signal; and
a register for storing the internal count signal selected by said internal count selector and outputting the stored value as the output signal of said counter unit in accordance with said clock signal.

4. The motor drive device according to claim 3, wherein said decoder unit comprises:
a plurality of excitation point specification decoders for generating excitation point specification signals for specifying the phase of the torque vector of said motor for each excitation method in accordance with the output signal of said counter unit; and
an excitation point specification selector for selecting any one of said plurality of excitation point specification signals in accordance with said excitation method switching signal.

5. The motor drive device according to claim 4, wherein said plurality of internal count decoders switch between incrementing and decrementing said internal count signal in accordance with a rotation direction switching signal for indicating the rotation direction of said motor; and
said decoder unit has:
a positive-rotation decoder for generating an excitation point specification signal for specifying the phase of the torque vector during positive rotation of said motor, with said plurality of excitation point specification decoders and said excitation point specification selector constituting a set;
a negative-rotation decoder for generating an excitation point specification signal for specifying the phase of the torque vector during negative rotation of said motor, with said plurality of excitation point specification decoders and said excitation point specification selector constituting a set; and
a rotation direction switching selector for selecting any one of the excitation point specification signal inputted from said positive-rotation decoder and the excitation point specification signal inputted from said negative-rotation decoder, in accordance with said rotation direction switching signal.

6. The motor drive device according to claim 5, wherein the excitation point specification decoder that corresponds to the excitation method having the highest number of steps among said plurality of excitation point specification decoders is shared as a combination positive-rotation/negative-rotation decoder between said positive-rotation decoder and said negative-rotation decoder.

7. The motor drive device according to claim 5, wherein said decoder unit has a synchronizing circuit for synchronizing said rotation direction switching signal with said clock signal.

8. An electronic device comprising:
said motor; and
the motor drive device according to any of claims 1 through 7.

9. A motor drive device comprising:
a signal generator for generating control signals of a second input method that include a polarity signal for indicating the polarity of an excitation current that flows to a motor, and a current amount signal for indicating the amount of said excitation current, from control signals of a first input method that include a clock signal for indicating a stepping drive period of the motor, and an excitation method switching signal for indicating an excitation method of said motor; and
a drive unit for step-driving said motor on the basis of the control signals of the second input method that are generated by said signal generator; wherein
said signal generator generates control signals of the second input method so that the correlation between the number of pulses of said clock signal and the phase of the torque vector of said motor is held in common for all the excitation methods, with the excitation method having the greatest number of steps being used as a reference, and that the torque vector of said motor as a rule is maintained in the same phase as before switching when the excitation method is switched.

10. The motor drive device according to claim 9, wherein said signal generator generates control signals of the second input method from control signals of the first input method and controls the torque vector of said motor so that the torque vector is in the closest phase in the rotation direction of said motor in a case in which there is no phase that is the same as the phase prior to switching when the excitation method is switched.

11. The motor drive device according to claim 9, wherein said signal generator comprises:
- a counter unit for counting the number of pulses of said clock signal; and
- a decoder unit for generating control signals of the second input method on the basis of an output signal of said counter unit and said excitation method switching signal.

12. The motor drive device according to claim 11, wherein said counter unit comprises:
- a plurality of internal count decoders for generating an internal count signal for each excitation method in accordance with the fed-back output signal of said counter unit;
- an internal count selector for selecting any one of said plurality of internal count signals in accordance with said excitation method switching signal; and
- a register for storing the internal count signal selected by said internal count selector and outputting the stored value as the output signal of said counter unit in accordance with said clock signal.

13. The motor drive device according to claim 12, wherein said decoder unit comprises:
- a plurality of excitation point specification decoders for generating excitation point specification signals for specifying the phase of the torque vector of said motor for each excitation method in accordance with the output signal of said counter unit; and
- an excitation point specification selector for selecting any one of said plurality of excitation point specification signals in accordance with said excitation method switching signal.

14. The motor drive device according to claim 13, wherein said plurality of internal count decoders switch between incrementing and decrementing said internal count signal in accordance with a rotation direction switching signal for indicating the rotation direction of said motor; and
said decoder unit has:
- a positive-rotation decoder for generating an excitation point specification signal for specifying the phase of the torque vector during positive rotation of said motor, with said plurality of excitation point specification decoders and said excitation point specification selector constituting a set;
- a negative-rotation decoder for generating an excitation point specification signal for specifying the phase of the torque vector during negative rotation of said motor, with said plurality of excitation point specification decoders and said excitation point specification selector constituting a set; and
- a rotation direction switching selector for selecting any one of the excitation point specification signal inputted from said positive-rotation decoder and the excitation point specification signal inputted from said negative-rotation decoder, in accordance with said rotation direction switching signal.

15. The motor drive device according to claim 14, wherein the excitation point specification decoder that corresponds to the excitation method having the highest number of steps among said plurality of excitation point specification decoders is shared as a combination positive-rotation/negative-rotation decoder between said positive-rotation decoder and said negative-rotation decoder.

16. The motor drive device according to claim 14, wherein said decoder unit has a synchronizing circuit for synchronizing said rotation direction switching signal with said clock signal.

17. An electronic device comprising:
- said motor; and
- the motor drive device according to any of claims 9 through 16.

18. A motor drive device comprising:
- a first terminal to which is inputted a clock signal for indicating a stepping drive period of a motor;
- a second terminal to which is inputted an excitation method switching signal for indicating an excitation method of said motor; and
- a third terminal for outputting an excitation current for step-driving said motor on the basis of said clock signal and said excitation method switching signal; wherein
- said excitation current is generated so that the correlation between the number of pulses of said clock signal and the phase of the torque vector of said motor is held in common for all the excitation methods, with the excitation method having the greatest number of steps being used as a reference, and that the torque vector of said motor as a rule is maintained in the same phase as before switching when the excitation method is switched.

19. The motor drive device according to claim 18, wherein said excitation current is generated and the torque vector of said motor is controlled so that the torque vector is in the closest phase in the rotation direction of said motor in a case in which there is no phase that is the same as the phase prior to switching when the excitation method is switched.

20. An electronic device comprising:
- said motor; and
- the motor drive device according to any of claims 18 through 19.

* * * * *